(12) United States Patent
Cochran et al.

(10) Patent No.: US 7,546,485 B2
(45) Date of Patent: Jun. 9, 2009

(54) METHOD AND SYSTEM FOR EFFICIENT JOURNAL-BASED RESYNCHRONIZATION

(75) Inventors: Robert A. Cochran, Sacramento, CA (US); Marcel Duvekot, Rocklin, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 420 days.

(21) Appl. No.: 11/505,097

(22) Filed: Aug. 15, 2006

(65) Prior Publication Data

US 2008/0126443 A1    May 29, 2008

(51) Int. Cl.
*G06F 11/00* (2006.01)
(52) U.S. Cl. ........................................ 714/15
(58) Field of Classification Search .......... 714/2, 714/5–7, 11, 12, 15, 16, 18, 20, 21, 37, 39, 714/47
See application file for complete search history.

(56) References Cited

U.S. PATENT DOCUMENTS

| | | | |
|---|---|---|---|
| 6,442,706 B1 * | 8/2002 | Wahl et al. ................. | 714/6 |
| 6,502,205 B1 * | 12/2002 | Yanai et al. ................. | 714/7 |
| 6,578,120 B1 * | 6/2003 | Crockett et al. ............. | 711/162 |
| 7,103,797 B1 * | 9/2006 | Wahl et al. ................. | 714/6 |
| 2003/0177322 A1 * | 9/2003 | Crockett et al. ............. | 711/161 |
| 2005/0033828 A1 * | 2/2005 | Watanabe ................... | 709/219 |
| 2005/0223271 A1 * | 10/2005 | Butterworth et al. ......... | 714/6 |
| 2005/0235016 A1 * | 10/2005 | Amano et al. ............... | 707/204 |

* cited by examiner

*Primary Examiner*—Nadeem Iqbal

(57) ABSTRACT

Various method and system embodiments of the present invention employ enhanced journal-based resynchronization for resynchronization of a primary volume to a remote secondary volume following restoration of a communications link or another event. Enhanced journal-based resynchronization involves maintaining a filled journal after the primary component system has resorted to bitmap-based journaling. Following communications-link restoration, or another event, enhanced resynchronization analyzes various values maintained by the primary component system to characterize the journaling state in order to determine whether or not to first merge the filled journal with the track-based bitmap before carrying out bit-map-based resynchronization, or to instead unspool the filled journal and transmit the unspooled WRITE requests to the second component system prior to separately carrying out bit-map-based resynchronization.

15 Claims, 21 Drawing Sheets

METHOD AND SYSTEM FOR EFFICIENT JOURNAL-BASED RESYNCHRONIZATION

TECHNICAL FIELD

The present invention is related to fault-tolerant data-storage systems, highly available data-storage systems, and other computer systems and data-storage systems that redundantly store data and, in particular, to a method and system for efficient journal-based resynchronization of a primary data-storage volume with a remote secondary data-storage volume.

BACKGROUND OF THE INVENTION

A wide variety of fault-tolerant, highly available, and other computer systems and data-storage systems rely on storing one or more redundant copies of each stored data object in one or more discrete component systems so that, in the event of a failure that destroys, corrupts, or makes unavailable one copy of a redundantly stored data object, another data-object copy can be used both for executing data-retrieval operations as well as to restore the destroyed, corrupted, or unavailable stored data object. Often, each data object within a large collection of data objects, such as a file system or database, is stored, on a primary component computer system or data-storage system, in a primary data-storage volume and is stored, on a second component computer system or data-storage system, in a secondary data-storage volume that is either equivalent to, or a mirror copy of, the primary data-storage volume.

The second component computer system or data-storage system, referred to below as the "second component system," is generally interconnected with the primary computer system or data-storage system, referred to below as the "primary component system," by one or more communications media collectively referred to, in the following discussion, as a "communications link." In general, remote host or client computers or primary-system-resident clients issue WRITE, UPDATE, and other data-altering requests, collectively referred to as WRITE requests in the following discussion, to the primary component system. The primary component system executes the WRITE requests by writing data received in the WRITE requests to the primary volume within, or associated with, the primary component system. In addition to locally executing the WRITE requests, the primary component system forwards the received WRITE requests to the second component system for execution to the secondary volume. In certain systems, a two-phase commit protocol, or other such protocol, is used to ensure that WRITE requests executed to the primary volume are not committed until the WRITE requests forwarded to the second component system have been successfully executed to the secondary volume. In other systems, WRITE-request execution to the primary volume is allowed to proceed in advance of successful WRITE-request execution to the remote secondary volume. In either case, provision is generally made for circumstances in which the link between the first component system and the second component system fails.

In one commonly implemented technique in currently available fault-tolerant, highly available, and other computer systems and data-storage systems, a journal for WRITE requests is maintained by the first computer system or data-storage system. All received WRITES are buffered in the journal until notice is received from the second computer system or data-storage system that the WRITE or update operations have been successfully executed on the second computer system or data-storage system. When the communication link fails, WRITE requests accumulate in the journal. When the link is restored, the WRITE requests buffered within the journal are unspooled and issued in order to the second computer system or data-storage system for execution in an operation referred to as "resynchronization." Once resynchronization has completed, and the contents of the primary volume and secondary volume are equivalent and up-to-date, normal operation of the system continues. In cases where the link remains inoperative for extended periods of time, and in which the system needs to continue to receive and execute WRITE requests from host or client computers, the journal may become completely filled. In these cases, WRITE operations may be executed locally to the primary volume, and a track-based bitmap may be maintained to indicate which tracks of the primary volume have been altered since the last point in time at which the primary volume and secondary volume were in equivalent data states. Upon restoration of the communications link, a bitmap-based resynchronization operation can be undertaken to resynchronize the primary volume with the remote secondary volume in which those tracks that are indicated to be altered are sent, generally out-of-order with respect to the order in which they were received, from the primary component system to the second component system.

Although journal-based resynchronization has proved to be an effective technique for allowing a computer system or data-storage system to continue to operate following a communications-link failure, and to resynchronize the primary volume and secondary volume following communications-link restoration, journal-based resynchronization may, in certain cases, involve significant resynchronization computational and communications overhead and delay, particularly in cases in which the journal has been filled, and the computer system or data-storage system resorts to track-based bitmap journaling. For these reasons, designers and manufacturers of fault-tolerant and/or highly available computer systems and data-storage systems have recognized the need for more efficient resynchronization operations to minimize computational and communications overhead and delay associated with resynchronization.

SUMMARY OF THE INVENTION

Various method and system embodiments of the present invention employ enhanced journal-based resynchronization for resynchronization of a primary volume to a remote secondary volume following restoration of a communications link or another event. Enhanced journal-based resynchronization involves maintaining a filled journal after the primary component system has resorted to bitmap-based journaling. Following communications-link restoration, or another event, enhanced resynchronization analyzes various values maintained by the primary component system to characterize the journaling state in order to determine whether or not to first merge the filled journal with the track-based bitmap before carrying out bit-map-based resynchronization, or to instead unspool the filled journal and transmit the unspooled WRITE requests to the second component system prior to separately carrying out bit-map-based resynchronization.

DETAILED DESCRIPTION OF THE INVENTION

Figure 1A:
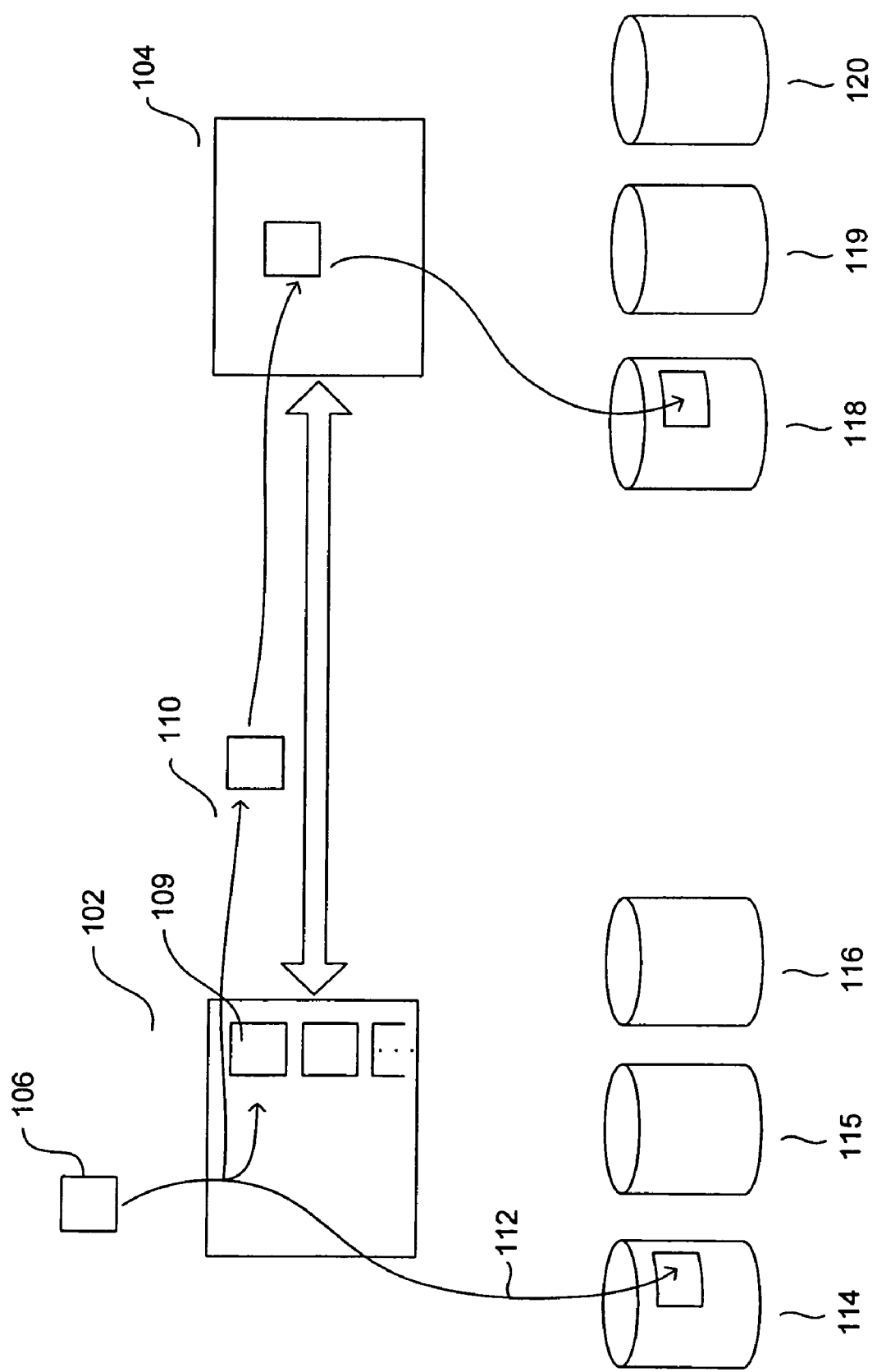
FIGS. 1A-B illustrate a fault-tolerant, highly available, or other system that serves as a context for discussion of conventional journal-based resynchronization and the enhanced journal-based resynchronization that represents an embodiment of the present invention.
Figure 1B:
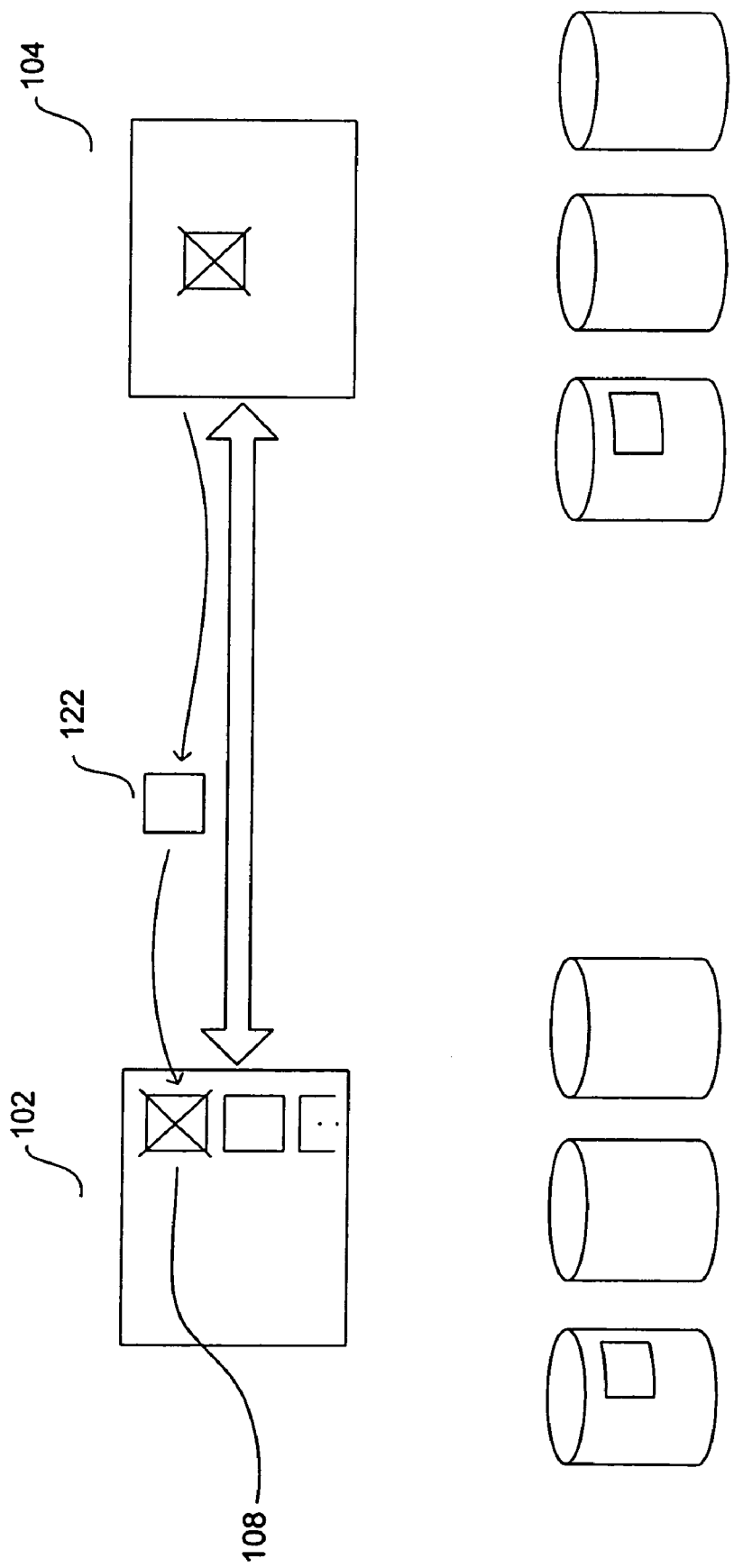

Method and system embodiments of the present invention are directed to enhanced journal-based resynchronization that provides greater computational, communications, and time efficiencies, in certain cases, than are provided by existing journal-based resynchronization. FIGS. 1A-B illustrate a fault-tolerant, highly available, or other system that serves as a context for discussion of conventional journal-based resynchronization and the enhanced journal-based resynchronization that represents an embodiment of the present invention. The system illustrated in FIGS. 1A-B may be a computer system, data-storage system, or another hybrid system that redundantly stores data in order to achieve a desired level of fault tolerance, high availability, or for other reasons. The system comprises a first, primary component system 102 and a second component system 104. The primary component system receives WRITE requests, such as WRITE request 106, from one or more remote host computers, remote clients, or client entities local to the primary component system. The received WRITE requests are buffered in a journal 109 within the primary component system, transmitted 110 to the second component system 104 for parallel execution by the second component system, and executed 112 on the primary component system by storing the received data in one or more mass-storage devices 114-116 and/or various levels of memory-based caches. The aggregate storage facilities to which WRITE requests are executed on the primary component system are referred to as the "primary volume," and the second component system 104 includes similar aggregate data-storage facilities 118-120 that together comprise a secondary volume to which the second component system executes WRITE requests forwarded by the primary component system. The journal 109 is typically a combination of electronic-memory caches and temporary storage along with all or portions of various mass-storage devices. When the WRITE or update operation is successfully executed by the second component system 104, as shown in FIG. 1B, the second component system returns an acknowledgment 122 that allows, upon receipt by the primary component system 102, for the journal entry 108 corresponding to the WRITE or update requests to be deleted, so that the entry space can be used for buffering a subsequent WRITE or update request.

Figure 2A:
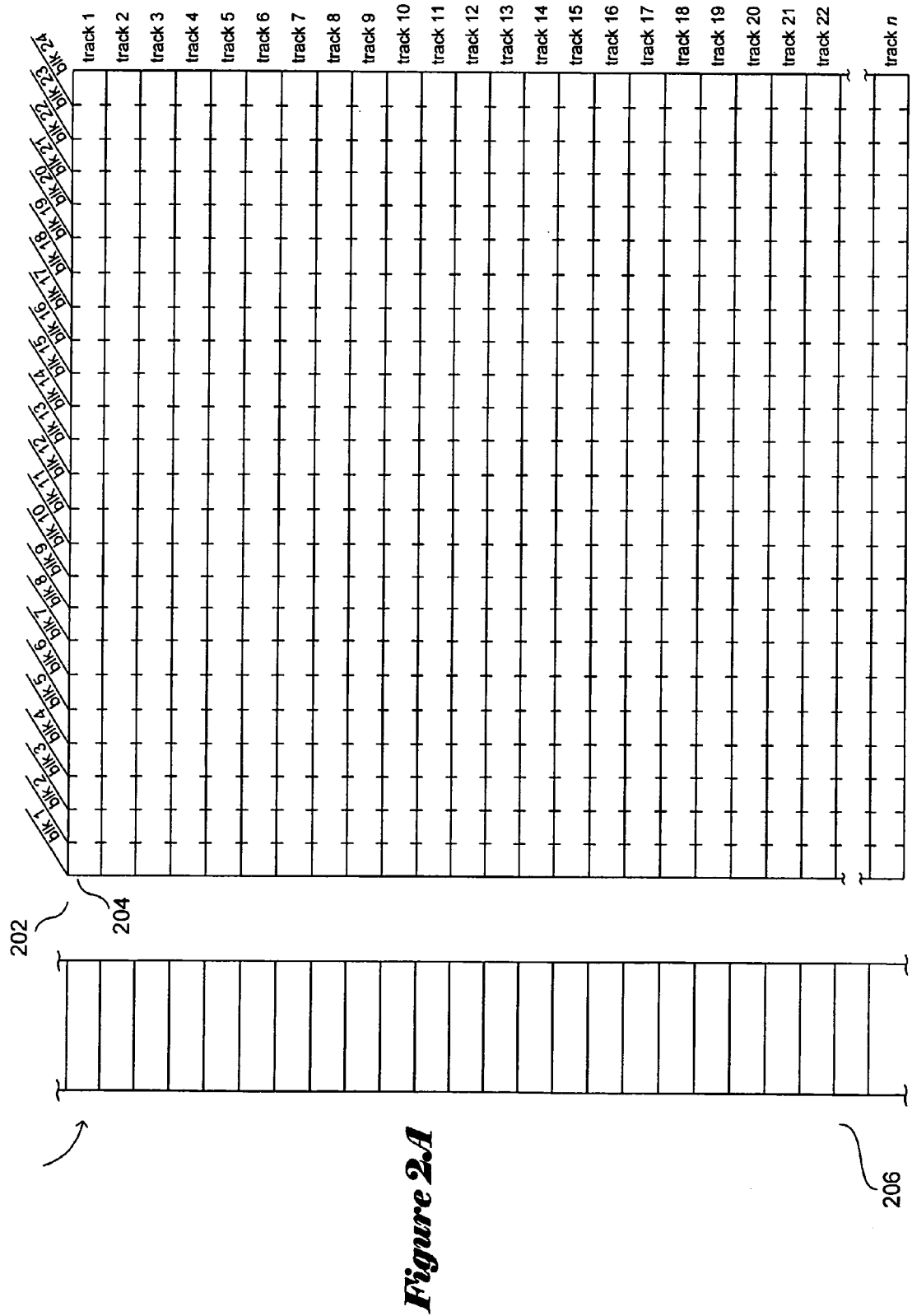
FIGS. 2A-K illustrate journaling by the primary component system.

FIGS. 2A-K illustrate journaling by the primary component system. FIGS. 2A-K all use the same illustration conventions, described next with reference to FIG. 2A. In FIG. 2A, the primary volume is represented as a matrix 202, each cell of which represents a block. Each row of the matrix, such as row 204, corresponds to a track within the primary volume. In the primary-volume representation shown in FIG. 2A, each track includes 24 blocks. A variety of different data-addressing schemes may be used to characterize data storage facilities that together compose a primary volume. For purposes of the current discussion, the primary volume is an abstract, interface-level data-storage facility that provides for storage of blocks of data within tracks, as shown in FIG. 2A. The sizes, in bytes, of the blocks and tracks are essentially arbitrary, and are selected by various considerations of typical data-object sizes, underlying data-storage unit sizes of physical data-storage media, a desired granularity for WRITE and UPDATE operations, and other considerations. In FIG. 2A, the journal 206 is represented as a first-in-first-out queue ("FIFO queue") in which WRITE requests are buffered, as discussed above with reference to FIGS. 1A-B.

Figure 2B:
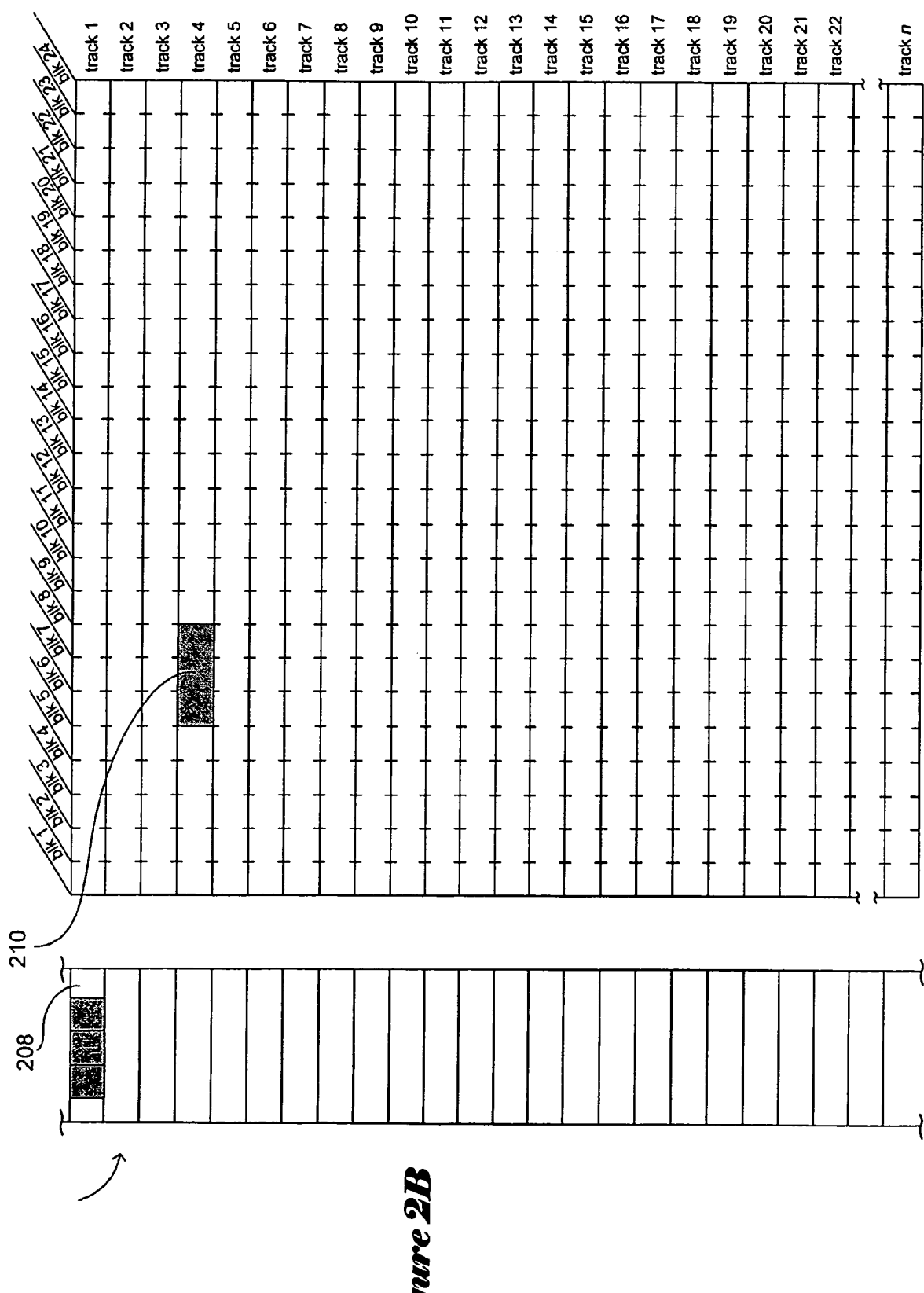
Figure 2C:
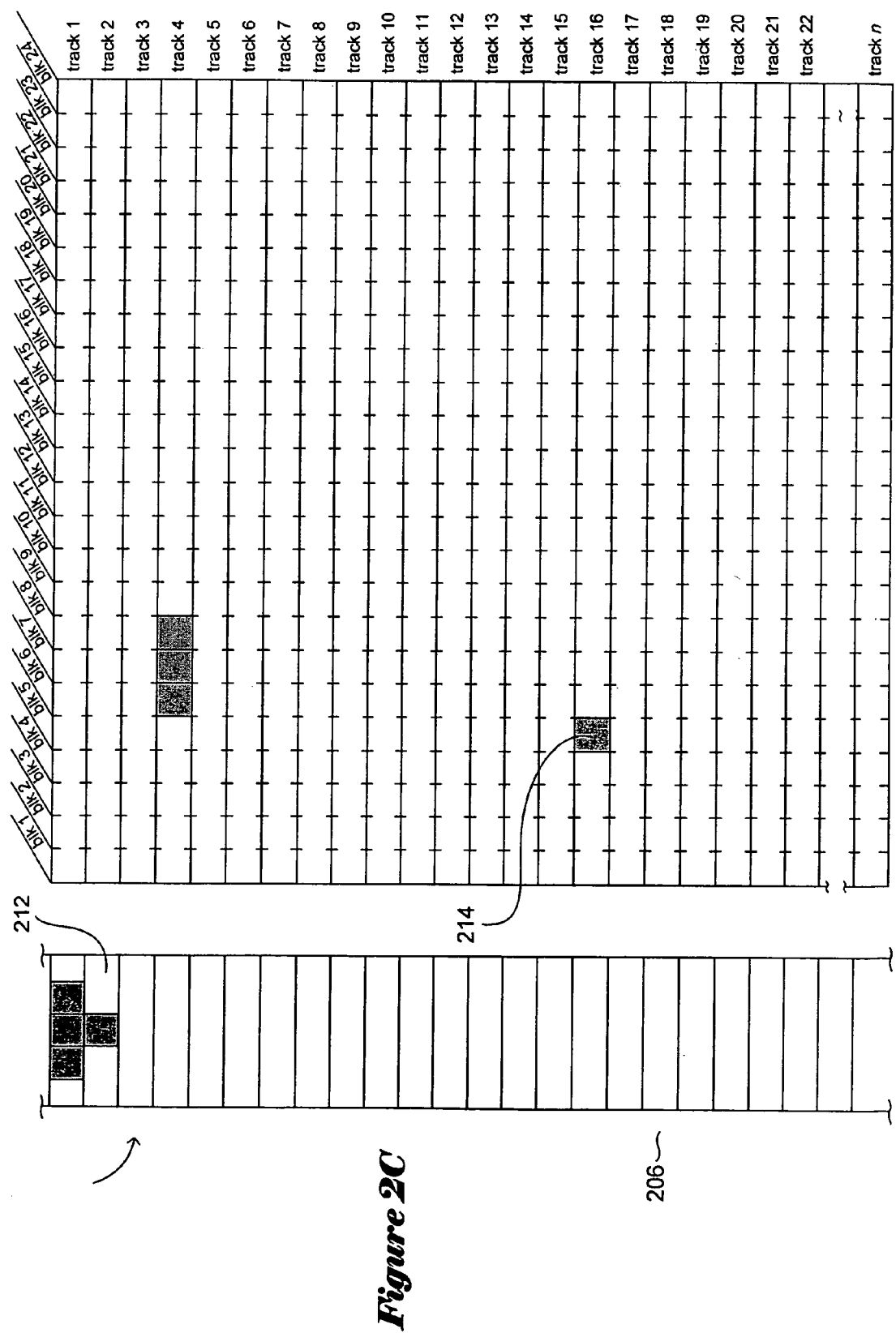
Figure 2D:
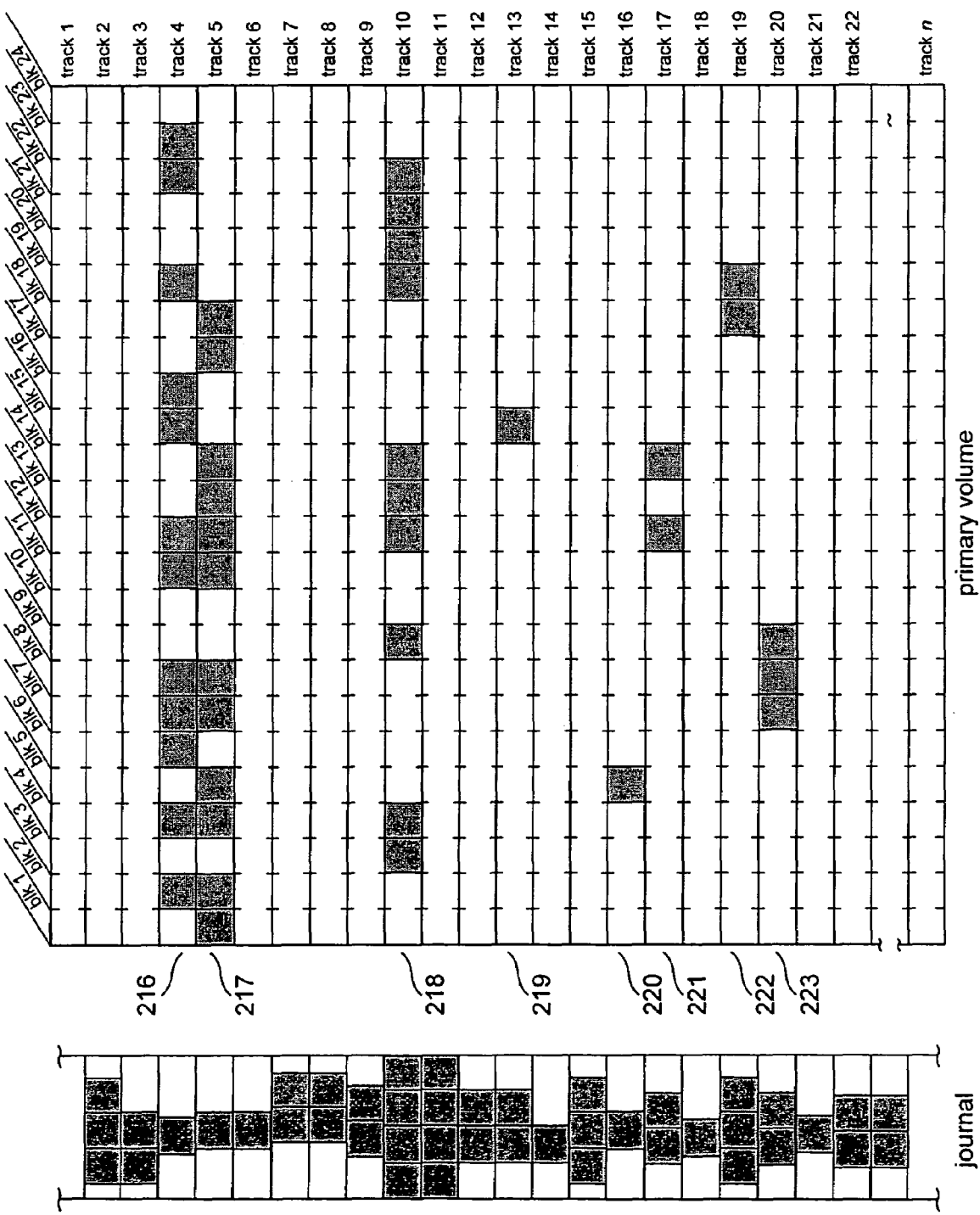

In FIG. 2B, a first WRITE request comprising three data blocks, and additional data not shown in FIG. 2B, is stored in the journal 208 and is successfully executed with respect to the primary volume, resulting in writing of three blocks 210 to the primary volume. In FIG. 2C, a second WRITE request 212 is buffered in the journal 206 and executed to the primary volume 214. Buffering of WRITE requests in the journal and execution of the WRITE requests to the primary volume may continue until a large number of WRITE requests are buffered in the journal and executed to the primary volume, as shown in FIG. 2D. Normally, as the second component system (104 in FIG. 1A) successfully executes WRITE requests forwarded from the primary component system, the second component system returns acknowledgments that allow the primary component system to flush the corresponding entries from the journal. However, in the case that the link between the primary and second component system fails, or for any of a variety of other reasons that prevent the primary component system, from receiving acknowledgements from the second component system, WRITE request entries may accumulate in the journal. In general, the journal may be of sufficient size to contain millions, hundreds of millions, or more buffered WRITE requests, depending on the system implementation and configuration. For clarity of illustration, a small journal and small primary volume are shown in FIGS. 2A-K. Thus, while the situation shown in FIG. 2D may routinely occur in a real system, due to the lag between buffering of WRITE requests by the primary component system and successful execution of the WRITE requests by the second component system, the situation shown in FIG. 2D can, for the purposes of the current discussion, be considered to represent a full journal. In other words, the journal shown in FIG. 2D is filled, and has no more free entries into which an additional WRITE or update request can be entered. Note that the WRITE requests buffered within the journal, as shown in FIG. 2D, are not uniformly distributed through the primary volume. Instead, a relatively few tracks 216-223 have been written or updated by the WRITE requests stored in the journal, while the remaining primary-volume tracks are unaltered.

Figure 2E:
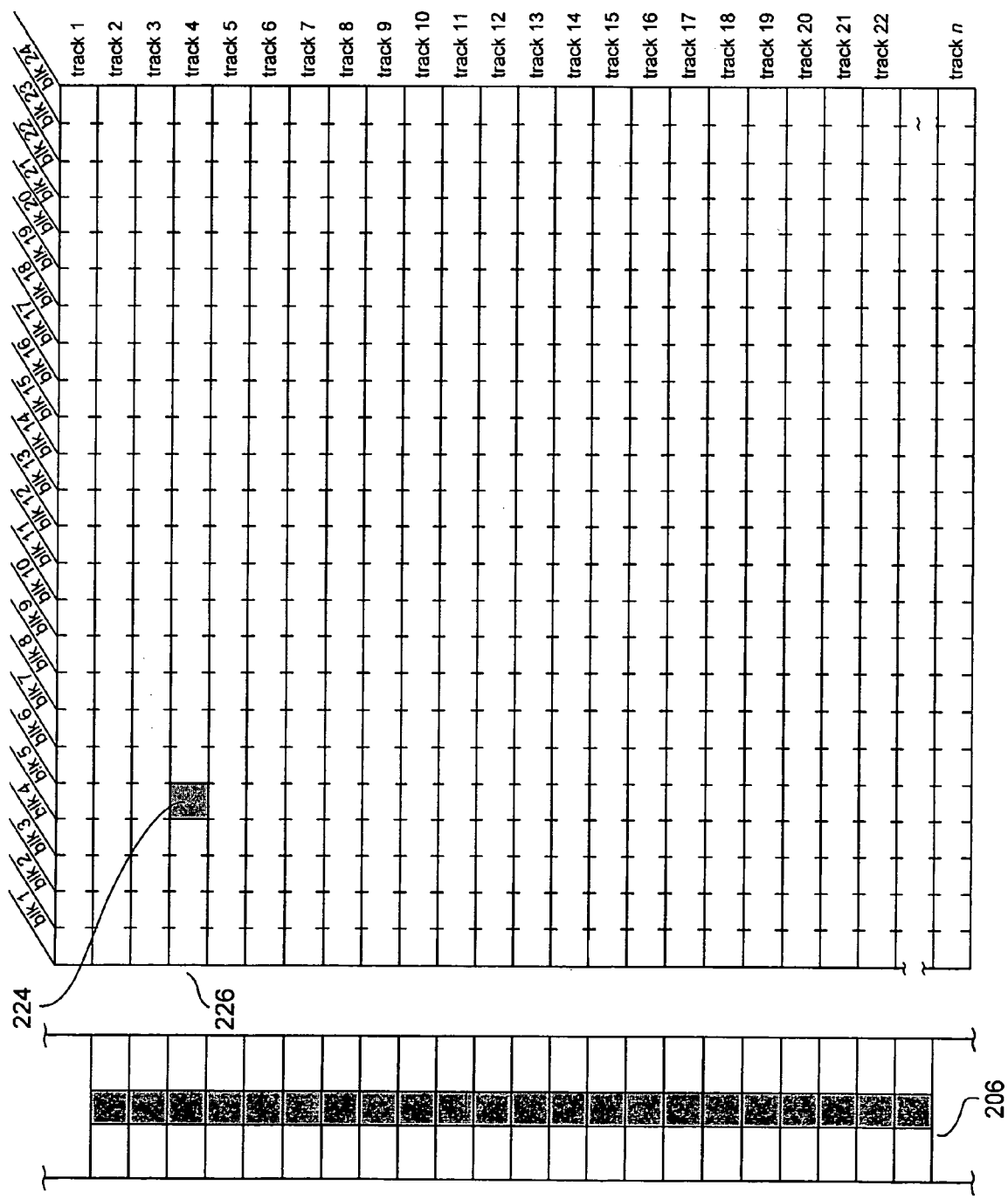
Figure 2F:
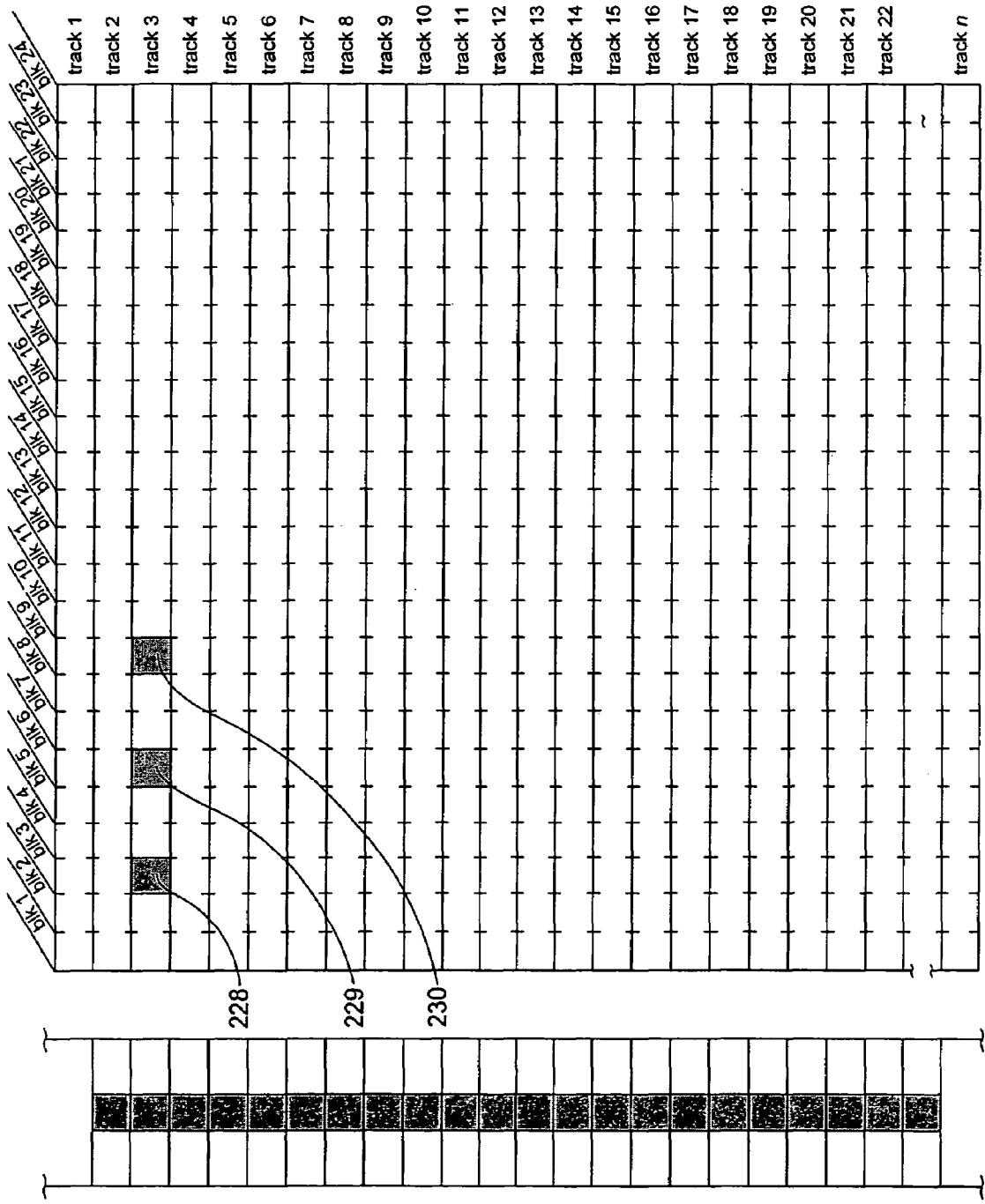
Figure 2G:
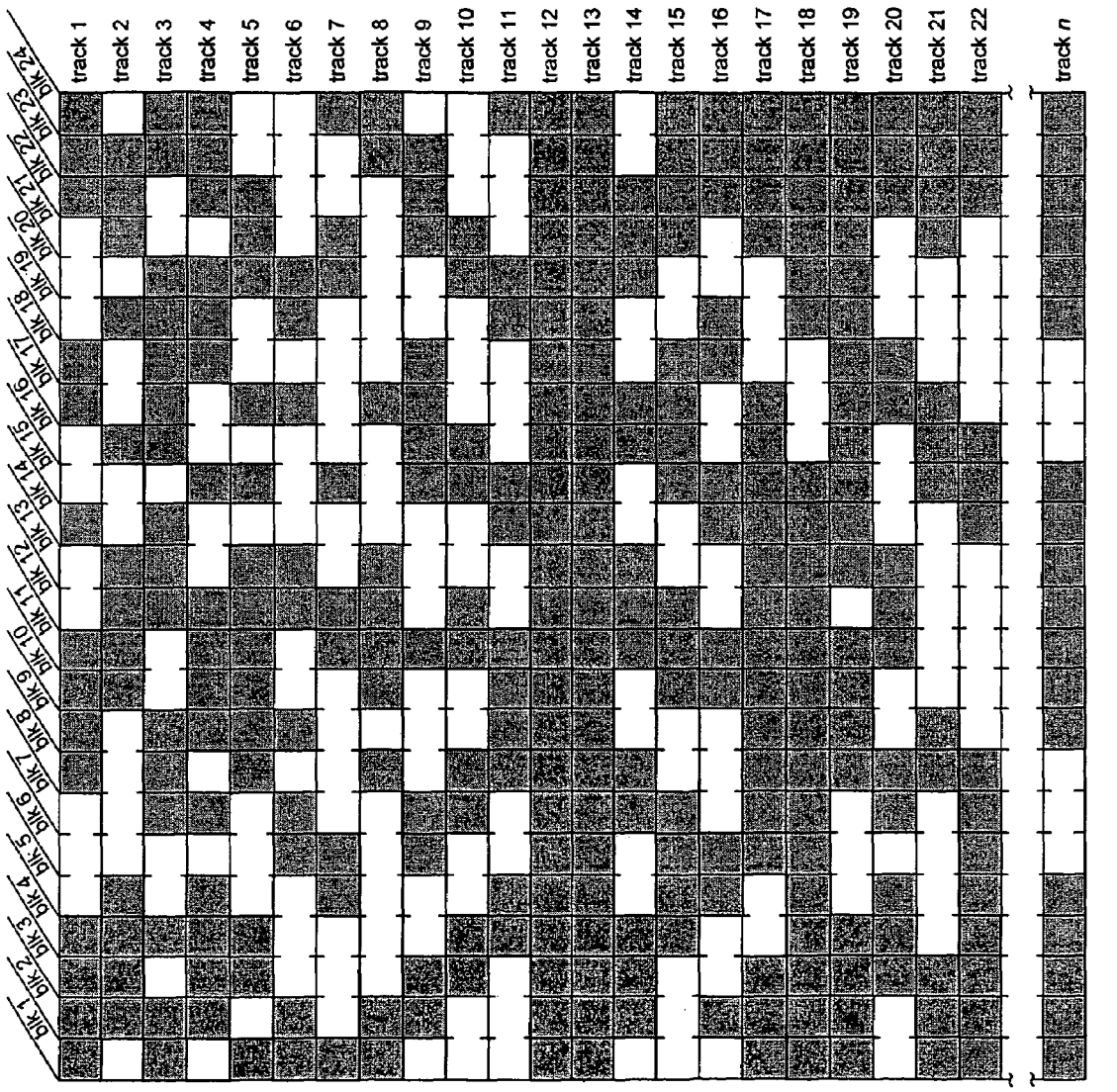
Figure 2G:
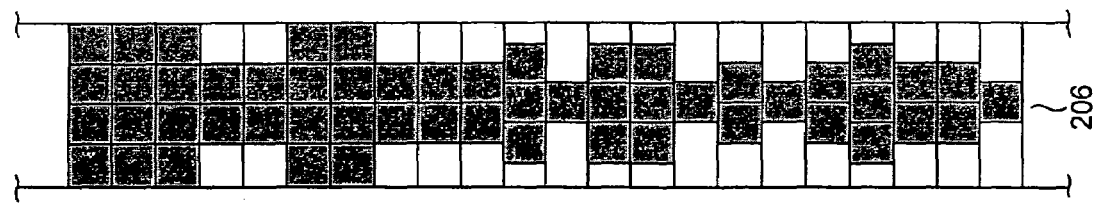

The correspondence between journal entries of a filled journal and altered blocks within the primary volume may fall between two extremes. In one extreme, as shown in FIG. 2E, all of the WRITE requests buffered in the journal 206 are single-block WRITE requests directed to a single block 224 of a single track 226 of the primary volume. In an actual system, this extreme would be unlikely to occur. However, it may often be the case that the vast number of recently received WRITE requests have been directed to a relatively small fraction of the total storage space represented by the primary volume. In certain systems, successive WRITE requests directed to a particular block or contiguous set of blocks may be compressed, on the fly, by overwriting a journal entry. However, practically, such on-the-fly compression can only be carried out over some fixed number of most recently received WRITE requests. Thus, in such systems, the extreme case shown in FIG. 2E may instead appear as the extreme case shown in FIG. 2F, where a small number of blocks 228-230 greater than the window for on-the-fly compression are successively and repeatedly written to, or updated by, stored WRITE requests. At the other extreme, the WRITE requests stored in the journal, as shown in FIG. 2G, may have altered a substantial portion of the blocks, and all tracks, within the primary volume.

Once the journal has filled, as discussed above, journal-based resynchronization methods commonly resort to a track-based bitmap for recording those tracks that have been altered subsequent to the last point in time at which the primary component system and second component system were known to have been synchronized, or to be in equivalent or identical data states. In currently employed journaling-based resynchronization methods, once the journal has filled, the journal is used to construct a track-based bitmap indicating all tracks altered by WRITE requests buffered in the journal, and the journal entries are then disregarded or discarded. FIGS. 2H-K show the track-based bitmap 240 obtained by conversion of the journal and primary volume shown in FIGS. 2D-G, respectively.

Figure 2H:
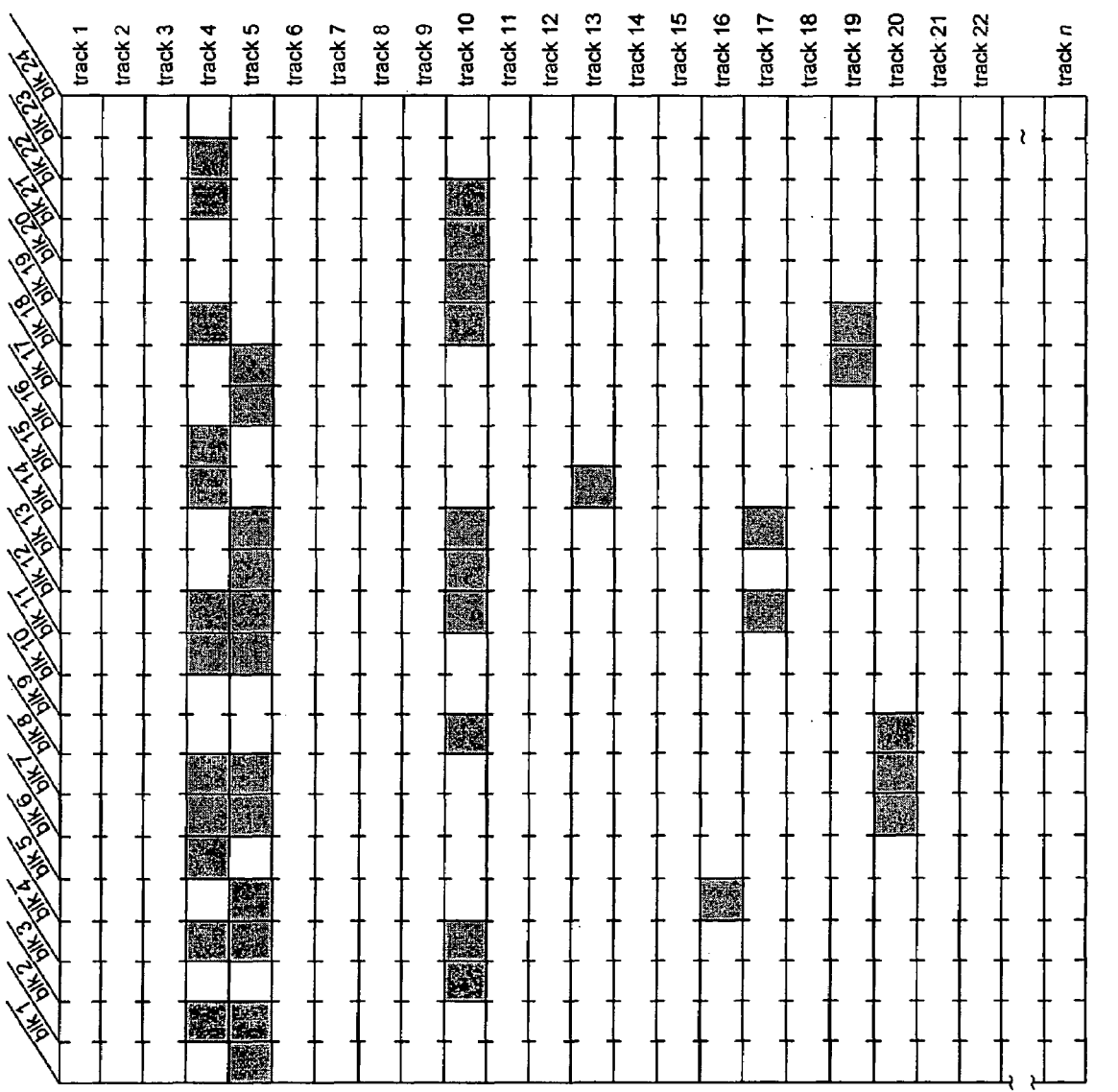
Figure 2I:
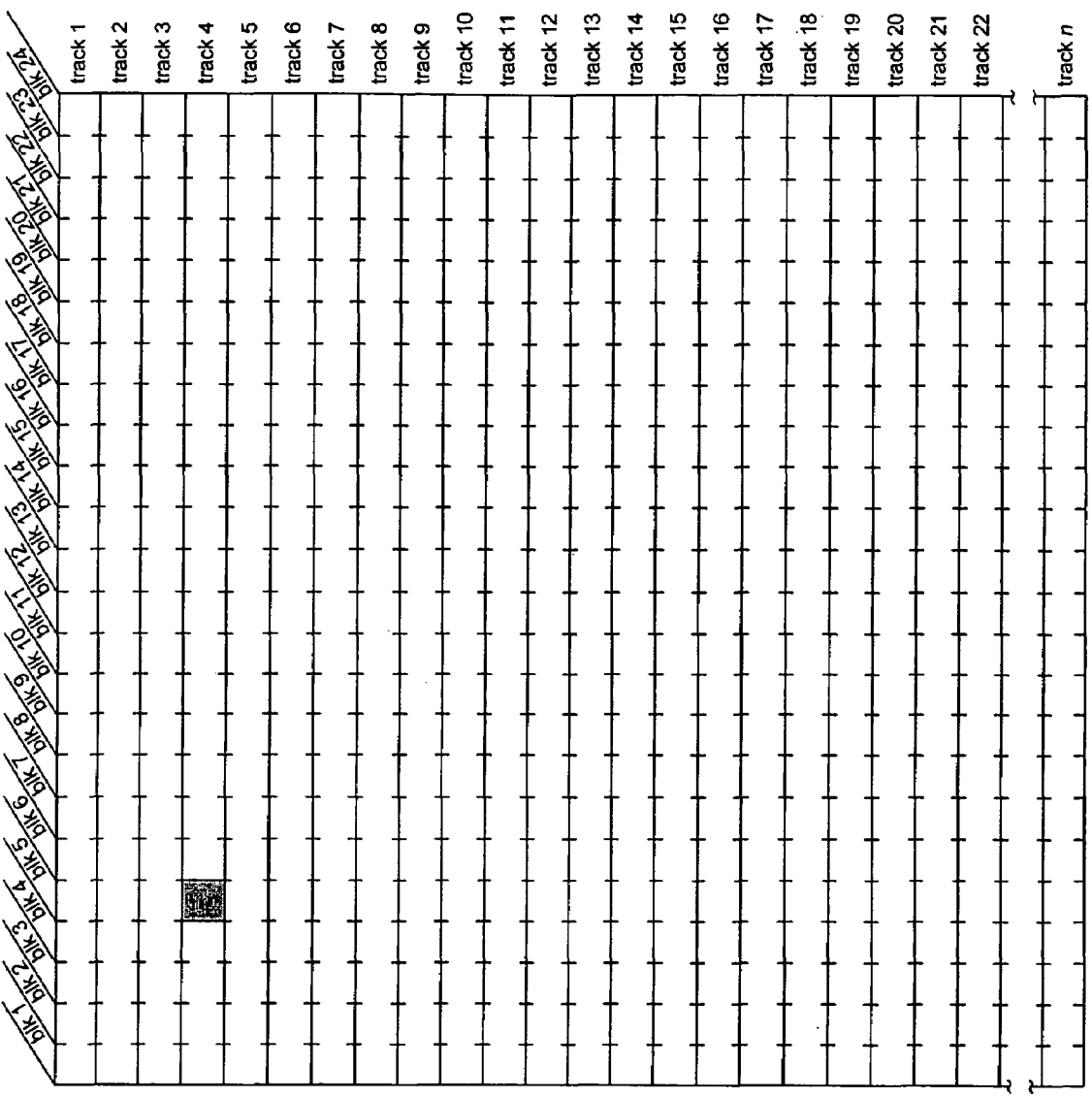
Figure 2I:
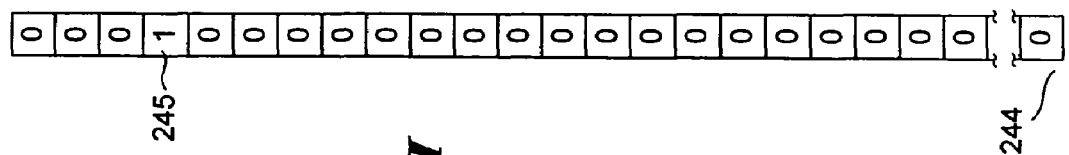
Figure 2J:
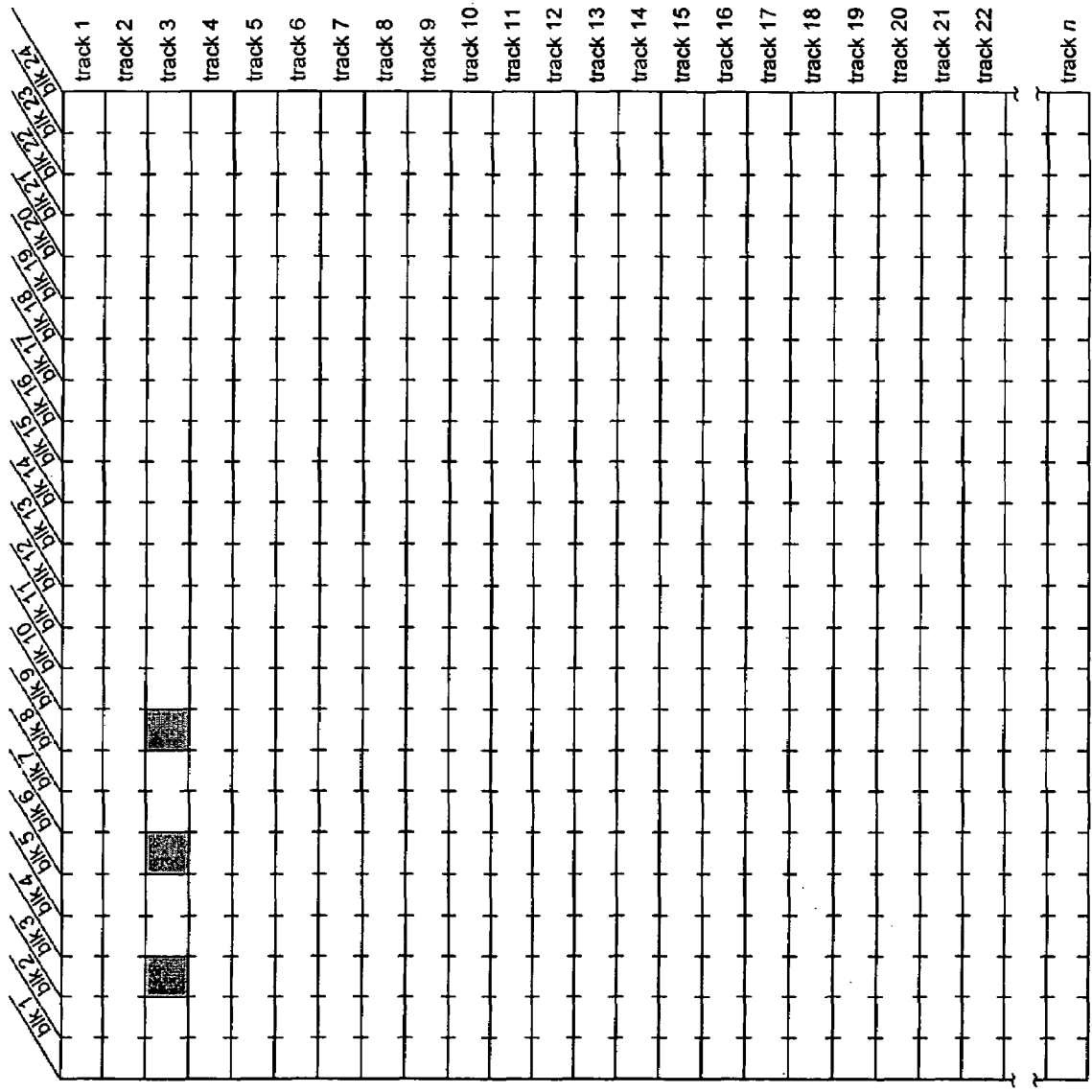
Figure 2K:
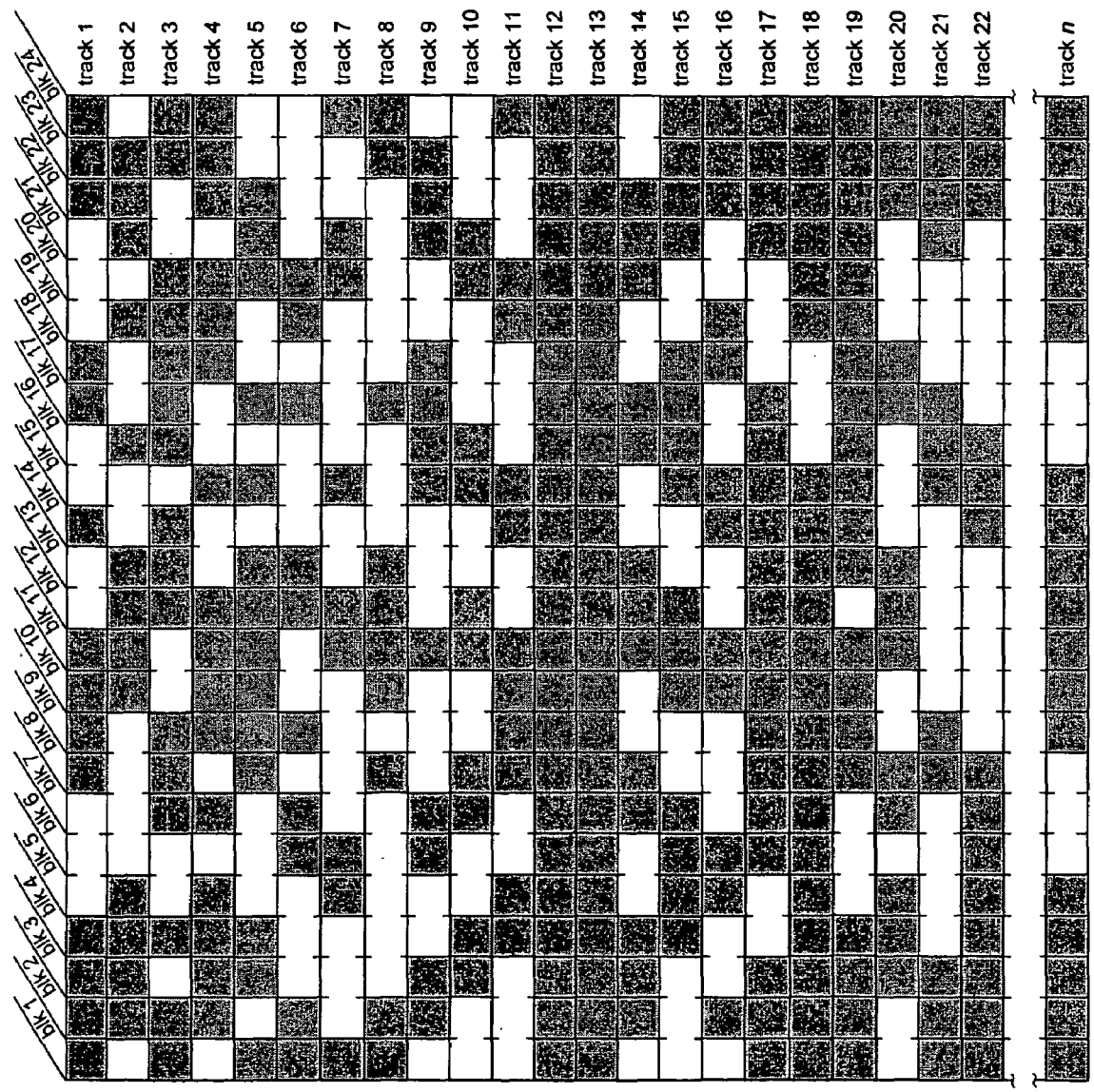
Figure 2K:
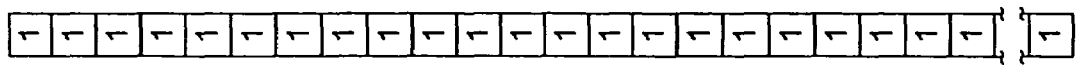

FIG. 2H shows the track-based bitmap 240 obtained by converting the journal and primary volume shown in FIG. 2D to a track-based bitmap. The bit corresponding to each track that has been altered or updated by WRITE operations that were buffered in the journal is set to binary value "1," as, for example, bit 242 corresponding to track 216. The remaining bits in the track-based bitmap 240 are set to binary value "0." As additional WRITE requests are received by the primary component system and executed to the primary volume, bits in the bitmap 240 corresponding to tracks altered by the subsequent WRITE operations are set to 1. In the case illustrated in FIGS. 2D and 2H, the journaled WRITE operations are non-uniformly distributed across the primary volume, resulting in a relatively sparsely populated bitmap 240. In the extreme cases illustrated in FIGS. 2E and F, the bitmaps 244 and 246 resulting from converting the journals in the example shown in FIGS. 2E and F are extremely sparse, with only a single bit 245 and 247, respectively, set in the bitmaps 244 and 246. However, in the other extreme case illustrated in FIG. 2G, the track-based bitmap 248 obtained upon journal conversion, shown in FIG. 2K, has essentially every bit set to the bit value "1."

Conversion of the journal to a track-based bitmap is carried out so that WRITE operations can continue to be executed while keeping track of those blocks in the primary volume altered by the WRITE operations. The track-based bitmap uses much less data-storage resources than the journal, since only a single bit is needed to represent the state of each track in the primary volume while, in the case of the journal, a very large number of bytes may be stored in the journal for each track of the primary volume. However, this savings in data-storage resources is offset by the amount of data that needs to be retrieved from the primary volume and transmitted to the second component system during a resynchronization operation. For example, consider FIGS. 2D and 2H. Were the journal shown in FIG. 2D to be unspooled and the WRITE requests contained in the journal transmitted to the second component system, a relatively small number of blocks would need to be transmitted to the second component system. However, once the journal has been collapsed to the track-based bitmap shown in FIG. 2H, each track corresponding to a set bit in the bitmap would need to be transmitted to the second component system in its entirety. In the case of tracks 216 and 217, it may actually be most efficient to transmit the entire tracks to the second component system, rather than to individually read and transmit the large fraction of altered blocks in the two tracks to the second component system. Quite often, because of the characteristics of mass-storage devices, it is more efficient to transfer an entire track of blocks rather than individually reading and transmitting even a relatively small fraction of the blocks distributed throughout the track, due, for example, to starting and stopping disk heads and latencies involved in seeking for particular blocks. However, in the case of track 219, since only a single block has been altered in the track, it would generally be far more efficient to read and transmit the single altered block than to read and transmit the entire track. Although the break-even point for block-based versus track-based transmission of data blocks differs for different systems employing different types of mass-storage devices, controllers, communication links, and other components, it is generally the case that there is a threshold number of blocks per track below which transmitting individual blocks is more efficient than transmitting the entire track, and above which transmitting the track is more efficient than reading and transmitting individual blocks from the track. Prior to collapsing the journal to a track-based bitmap, a decision may be made, by sorting the journal entries, as to whether it would be more efficient to transmit the individual blocks contained in journal entries within a particular track to the second component system, or more efficient to transfer the entire track. However, following collapse of a journal to a track-based bitmap, following, for example, exhaustion of journal space due to a relatively long link failure, the only available approach to resynchronize the primary and secondary volumes is to transfer entire tracks, since the information concerning individual blocks altered by the buffered WRITE operations is lost when the journal is converted to the track-based bitmap.

Various embodiments of the present invention are directed to an enhanced journal-based resynchronization method and system in which, once a journal has filled, the journal is not discarded or disregarded, but is instead maintained along with a track-based bitmap that is used for recording primary-volume-track alterations following exhaustion of the storage space of the journal. Maintaining the filled journal while using a track-based bitmap may allow for a much more efficient resynchronization operation once a communications link is restored. In the enhanced resynchronization operation, a decision is made whether to first merge the journal with the track-based bitmap, before transmitting altered tracks based on the track-based bitmap to the second component system, or to instead unspool the journal, transmitting journal entries or blocks to be written to the second component system, prior to transmitting tracks to the second component system based on the contents of the track-based bitmap. In these embodiments of the present invention, journal entries directed to tracks with bits set in the track-based bitmap may be discarded, since were they to be unspooled and transmitted to the second component system, the blocks involved would only be subsequently overwritten when the tracks marked for transmission in the track-based bitmap are transmitted to the second component system.

Figure 3A:
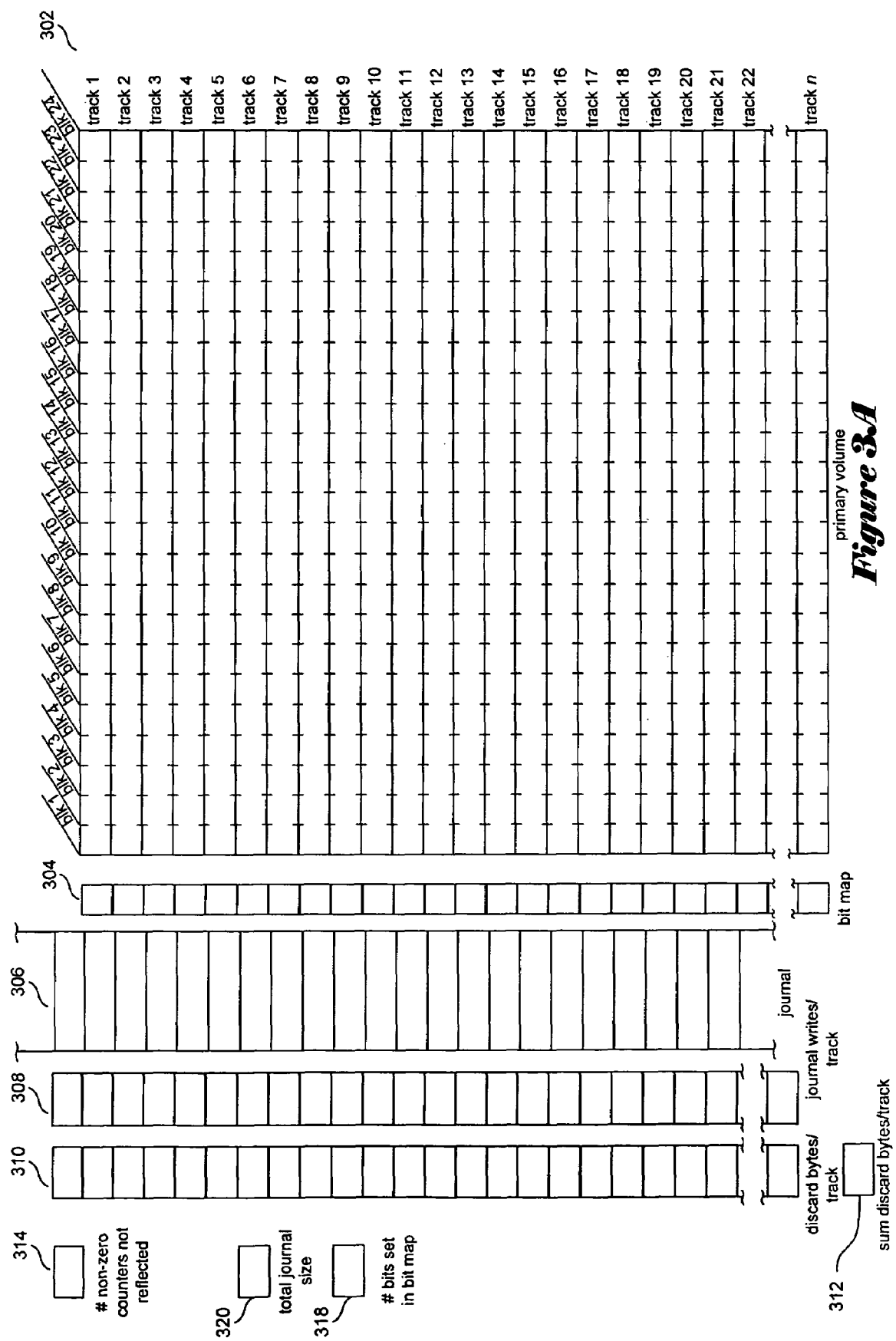
FIGS. 3A-F illustrate the auxiliary variables and data structures employed by enhanced-journaling methods of the present invention to facilitate a decision as to whether to merge a filled journal with the track-based bitmap, or to unspool the filled journal and transmit unspooled WRITE requests to the second component system prior to transmitting bit-map-flagged tracks to the second component system, as well as to facilitate data transfer when journal entries are transmitted prior to transmission of tracks.

In order to efficiently decide whether or not to merge the journal with the track-based bitmap, in various method and system embodiments of the present invention, and in order to efficiently transfer all needed data from the primary component system to the second component system during resynchronization, certain data is maintained by the primary component system on an ongoing basis to facilitate the decision and data transfer. FIGS. 3A-F illustrate the auxiliary variables and data structures employed by enhanced-journaling methods of the present invention to facilitate a decision as to whether to merge a filled journal with the track-based bitmap, or to unspool the filled journal and transmit unspooled WRITE requests to the second component system prior to transmitting bit-map-flagged tracks to the second component system, as well as to facilitate data transfer when journal entries are transmitted prior to transmission of tracks. FIG. 3A illustrates the primary volume, journal, track-based bitmap, and auxiliary data structures used in enhanced journaling methods and systems of the present invention. In FIG. 3A, the primary volume 302, track-based bitmap 304, and journal 306 are depicted using the same illustration conventions as used in FIGS. 2A-K.

In addition to the primary volume, journal, and track-based bitmap, method and system embodiments of the present invention employ an integer-valued array journal_writes_per_track 308, an integer-valued array discard_bytes_per_track 310, and the integer variables sum_discard_bytes 312, num_non-zero_counters_not_reflected 314, num_bits_set_in_bitmap 318, and total_journal_size 320. In alternative embodiments, numbers of kilobytes or megabytes may be stored in one or more of these variables and arrays, rather than bytes, and in certain embodiments, floating point rather than integer values may be used to store numbers of bytes, kilobytes, megabytes, or other data-storage size units. The journal_writes_per_track array includes the number of journal entries in the filled journal 306 directed to each track in the primary volume. The discard_bytes_per_track array 310 includes an estimate, for each track in the primary volume, of the number of bytes represented by all journal entries directed only to that track. Journal entries directed to multiple tracks are not counted in these estimates. The variable sum_discard_bytes 312 contains an estimate of the number of bytes in the journal that need not be transmitted due to tracks marked for transmission following journal-space exhaustion. The variable num_non-zero_counters_not_reflected 314 contains the number of journal_writes_per_track counters, or elements, that are currently greater than zero but not represented by entries in the track-based bitmap 304. Finally, the variable total_journal_size 320 contains the aggregate size of all data entries in the filled journal 306. In certain embodiments, the stored sizes of journal entries may include both data sizes and the sizes of additional metadata included in journal entries, while in other embodiments, only data sizes are reflected. In certain systems, stored WRITE requests in the journal may be compressed to eliminate all but a very small amount of metadata prior to forwarding of the data to the second component system, while, in other embodiments, journal entries are unspooled and forwarded without alteration.

Figure 3B:
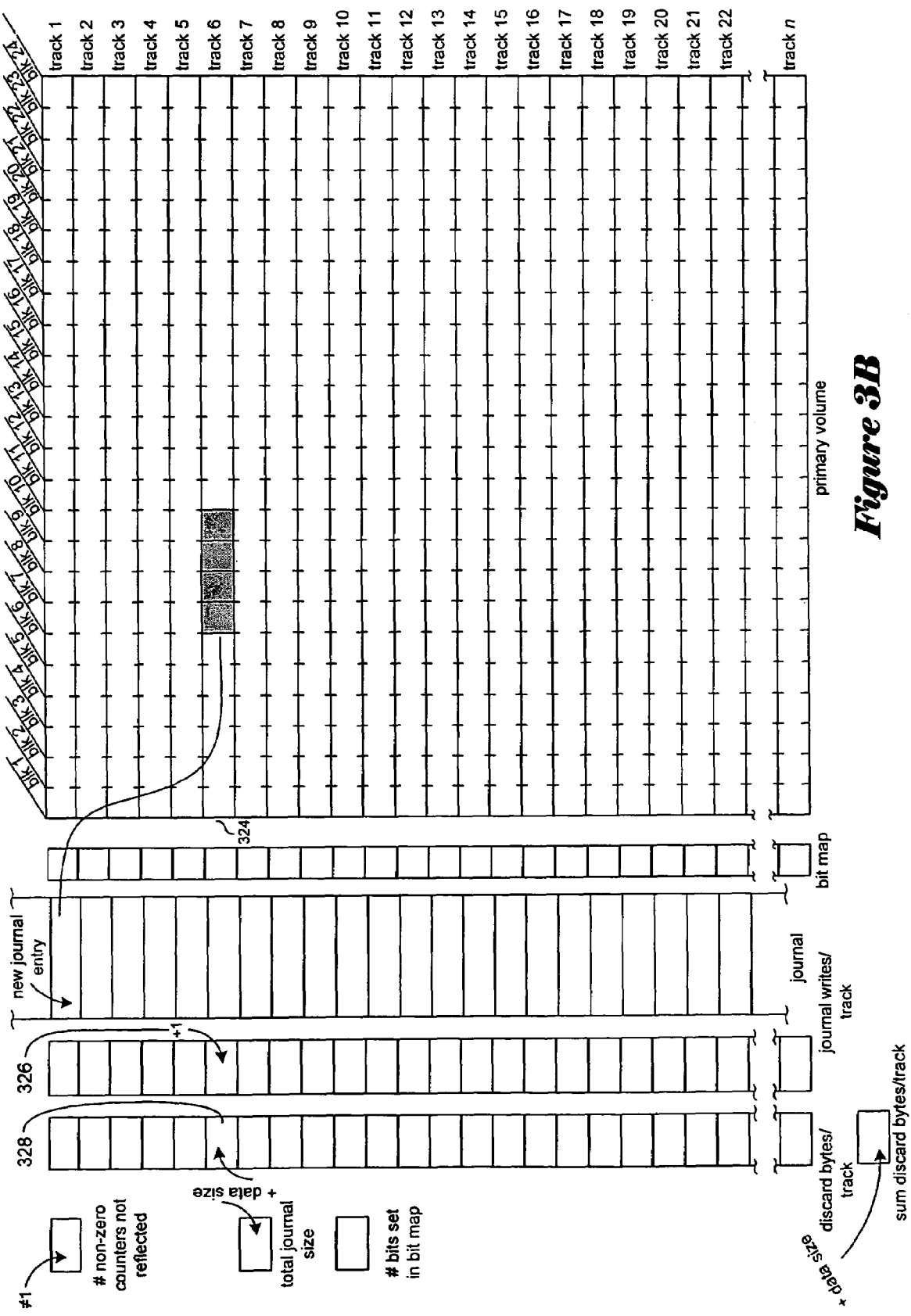
Figure 3C:
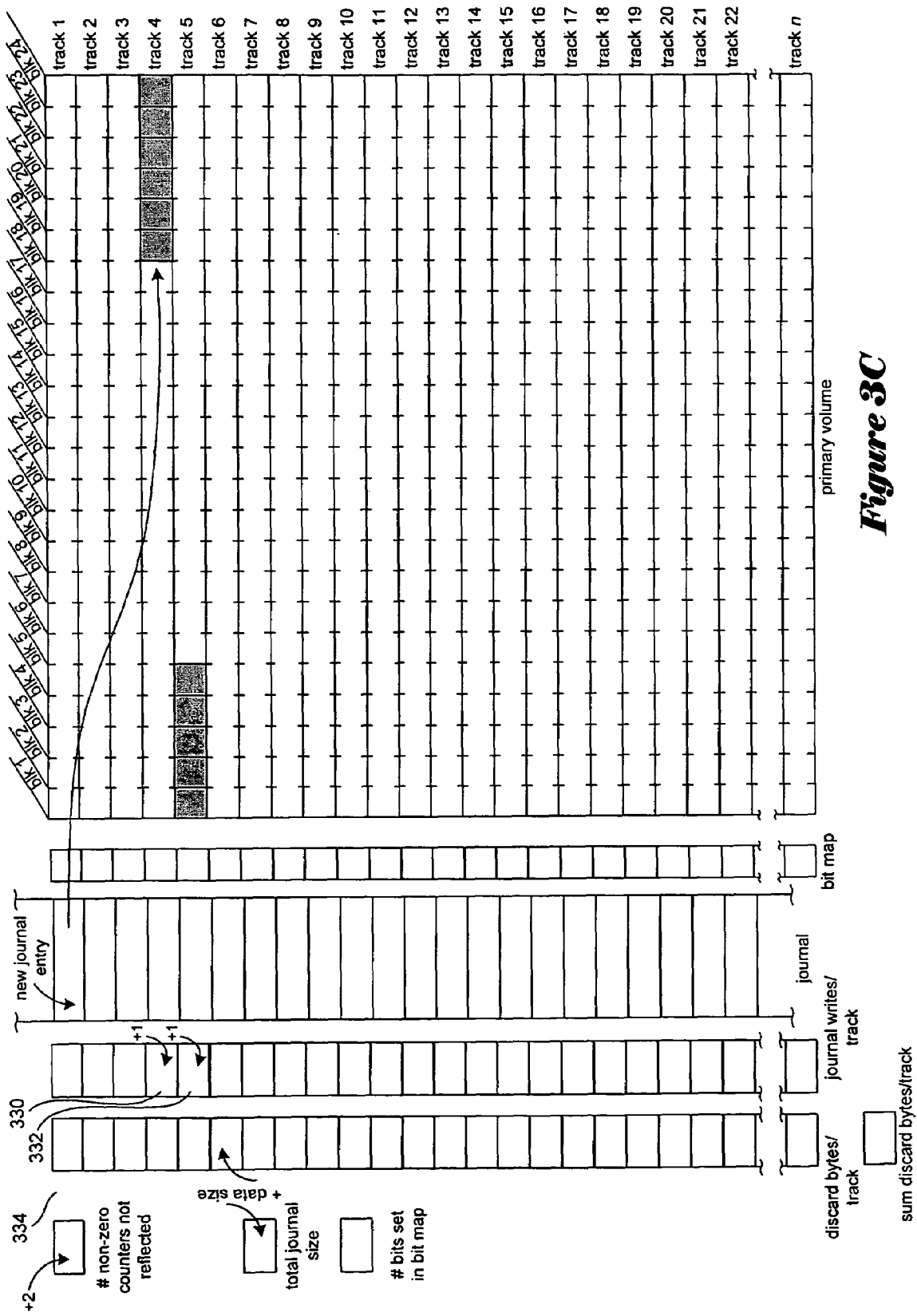

FIGS. 3B-F illustrate updating of the auxiliary data structures and variables discussed above with reference to FIG. 3A following various events that occur within the primary component system and that invoke data-structure changes. FIGS. 3B and 3C illustrate updating of the auxiliary data structures and variables when a new entry is entered into the journal. FIG. 3B illustrates updating of the auxiliary data structures and variables when the new entry represents a WRITE operation directed to a single track, while FIG. 3C illustrates updating of the auxiliary data structures and variables when a new entry is entered in the journal that is directed to multiple tracks. When the new journal entry is directed to a single track, as shown in FIG. 3B, the counter in the journal_writes_per_track array 308 corresponding to the track 324 to which the WRITE requests in the new journal entry are directed is incremented 326. The entry in the discard_bytes_per_track array corresponding to the track to which the WRITE requests are directed 324 is incremented by the data size of the WRITE request entered into the journal 328. The variable total_journal_size is also incremented by the data size of the WRITE requests represented by the new journal entry. The variable num_non-zero_counters_not_reflected 314 is incremented, and the variable sum_discard_bytes 312 is incremented by the size of the data in the WRITE requests represented by the new journal entry. When the WRITE requests represented by the new journal entry are directed to multiple tracks, as shown in FIG. 3C, then the counters in the journal_writes_per_track array corresponding to those tracks are incremented 330 and 332, the variable num_non-zero_counters_not_reflected is incremented once for each of the tracks 334, and the variable total_journal_size is incremented by the total data size of the WRITE requests represented by the new journal entry. However, unlike in the case shown in FIG. 3B, the discard_bytes_per_track array and variable sum_discard_bytes are not updated, since the WRITE request or requests are directed to multiple tracks.

Figure 3D:
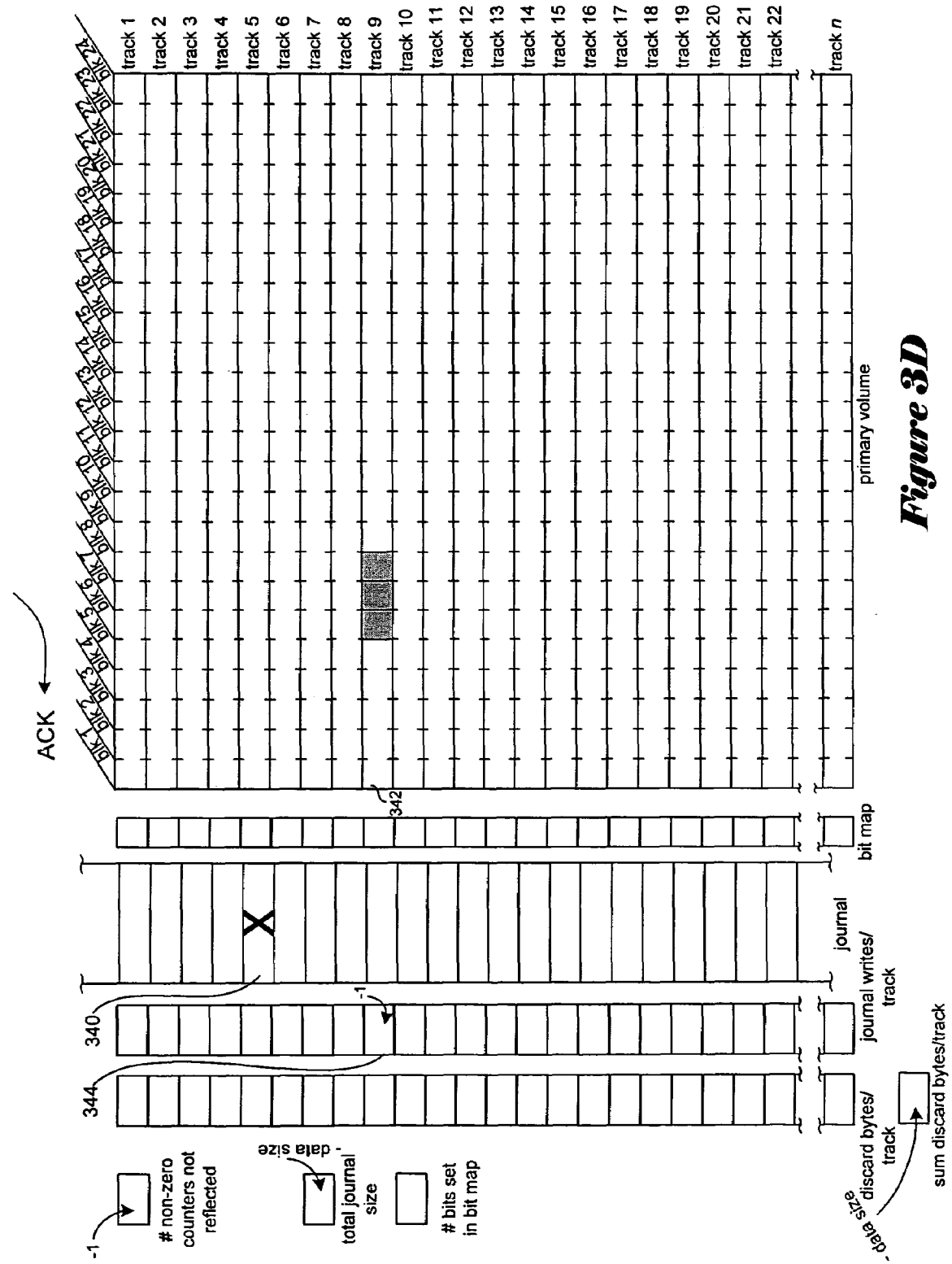
Figure 3E:
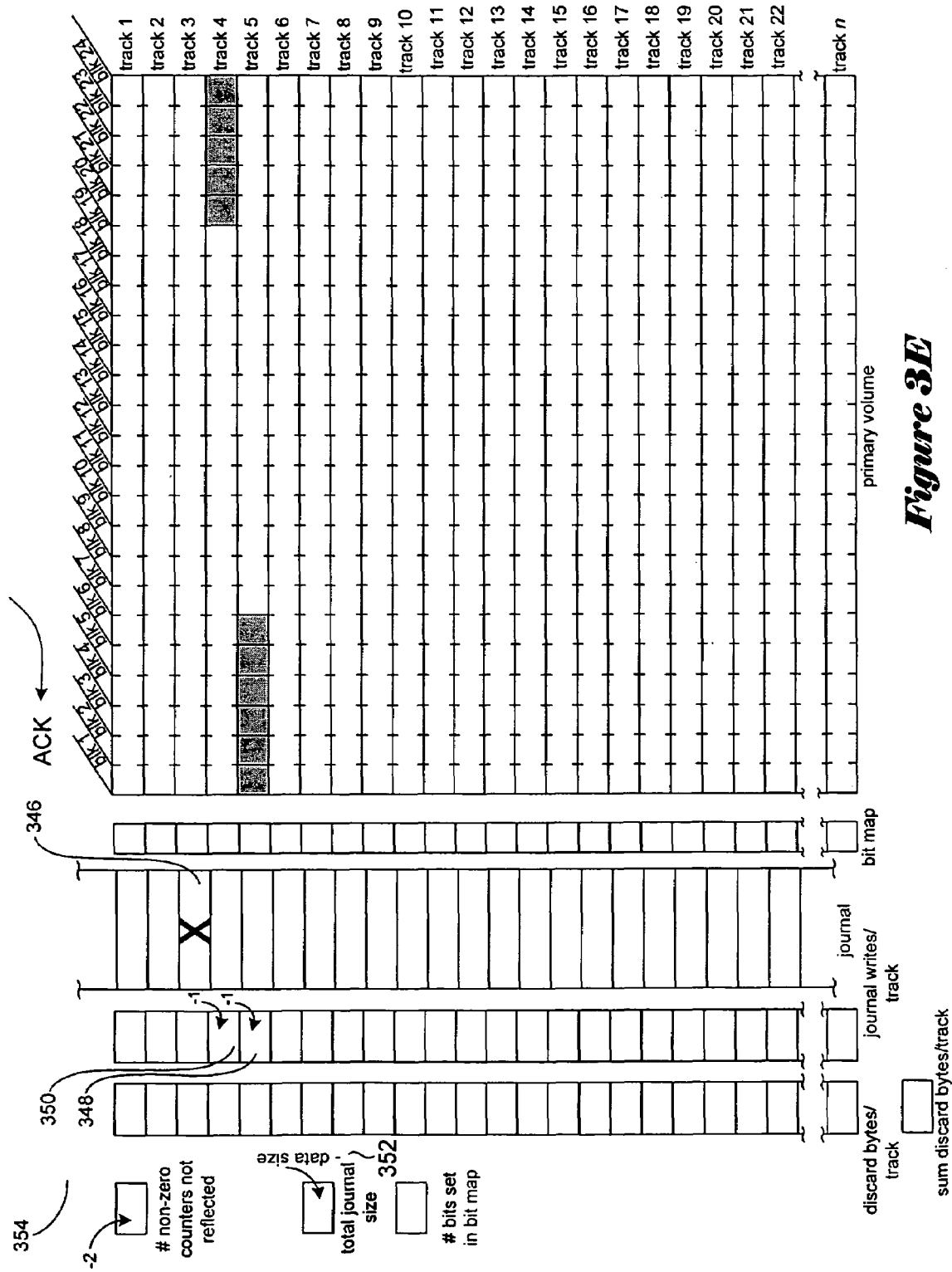

FIGS. 3D-E illustrate updates to the auxiliary data structures and variables employed in various embodiments of the present invention upon receipt by the primary component system of an acknowledgement from the second component system. In the case that the acknowledgement acknowledges execution of a WRITE request directed to a single track, as shown in FIG. 3D, the corresponding journal entry is deleted 340, the counter in the journal_writes_per_track array corresponding to the track to which the WRITE request was directed 342 is decremented 344, the variable num_non-zero_counters_not_reflected is decremented, and the variable total_journal_size, the variable sum_discard_bytes, and the corresponding entry in the array discard_bytes_per_track are all decremented by the size of the data represented by the journal entry 340 deleted in response to receiving the acknowledgment. In the case that the acknowledged WRITE request or update request span multiple tracks, as shown in FIG. 3E, the update operations illustrated in FIG. 3C are reversed, just as the update operations shown in FIG. 3B are reversed in the scenario illustrated in FIG. 3D. This involves deleting the journal entry 346, decrementing counters in the journal_writes_per_track array corresponding to the affected tracks 348-350, decrementing the variable total_journal_size by the size of the data represented by the deleted journal entry 352, and decrementing the variable num_non-zero_counters_not_reflected once for each affected track 354.

Figure 3F:
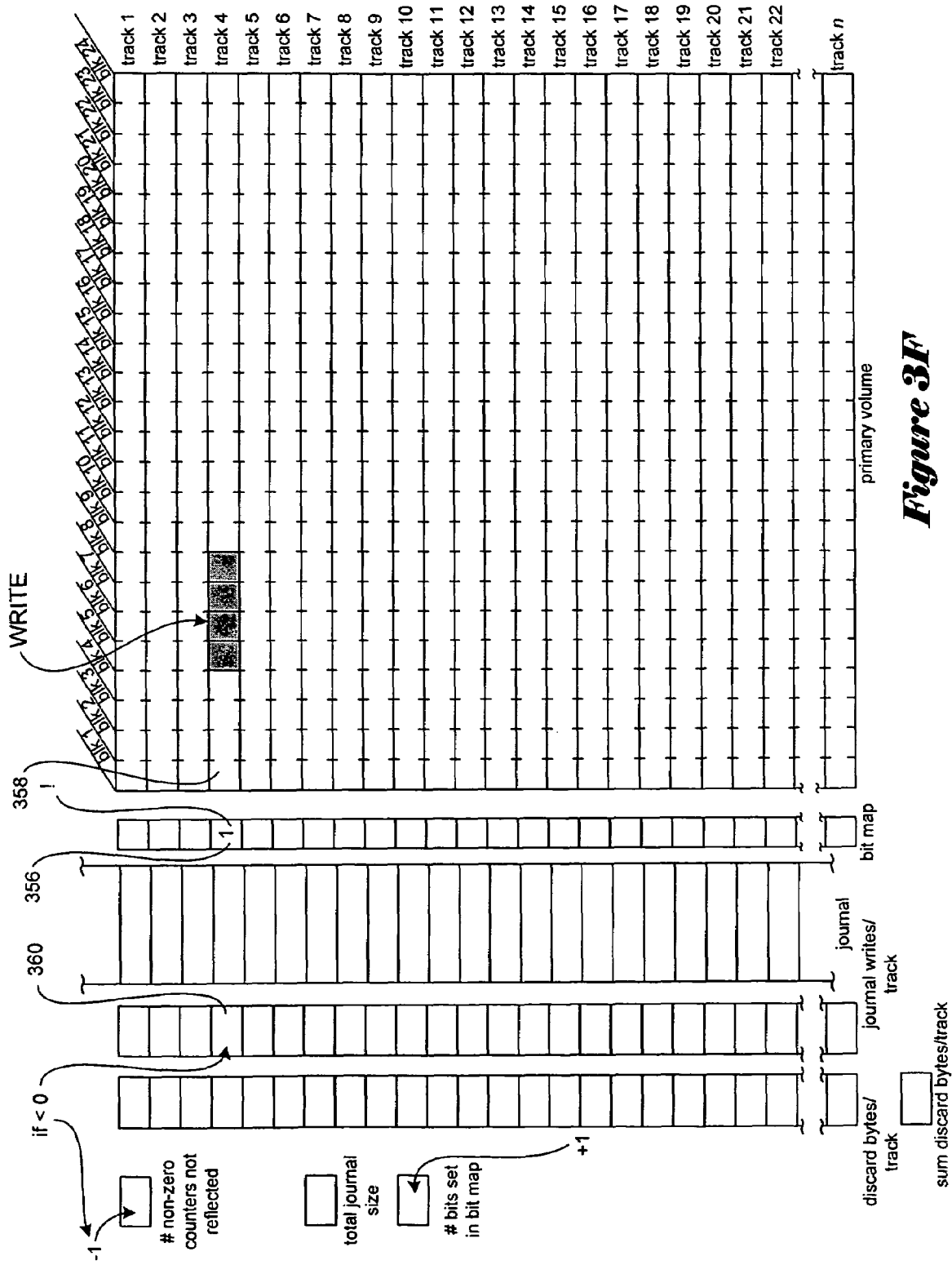

FIG. 3F illustrates updates to the auxiliary data structures and variables used in embodiments of the present invention when, following filling of the journal, track-based bitmap journaling is currently being used and a new WRITE request has been executed to the primary volume. If the bitmap entry 356 corresponding to the affected track 358 was not set prior to execution of the WRITE request, and is therefore set in response to the WRITE request, then if the corresponding counter 360 in the array_journal_writes_per_track is greater than zero, the variable num_non-zero_counters_not_reflected is decremented and the variable num_bits_set_in_bitmap is incremented.

By keeping track of the WRITE requests prior to journal exhaustion and following commencement of bitmap-based journaling, when forwarding of WRITE requests to the second component system is resumed, and the primary volume needs to be resynchronized with the secondary volume, method and system embodiments of the present invention can easily decide, for resynchronization, whether or not to merge the journal with the track-based bitmap or to employ the journal separately, prior to employing the track-based bitmap.

Figure 4:
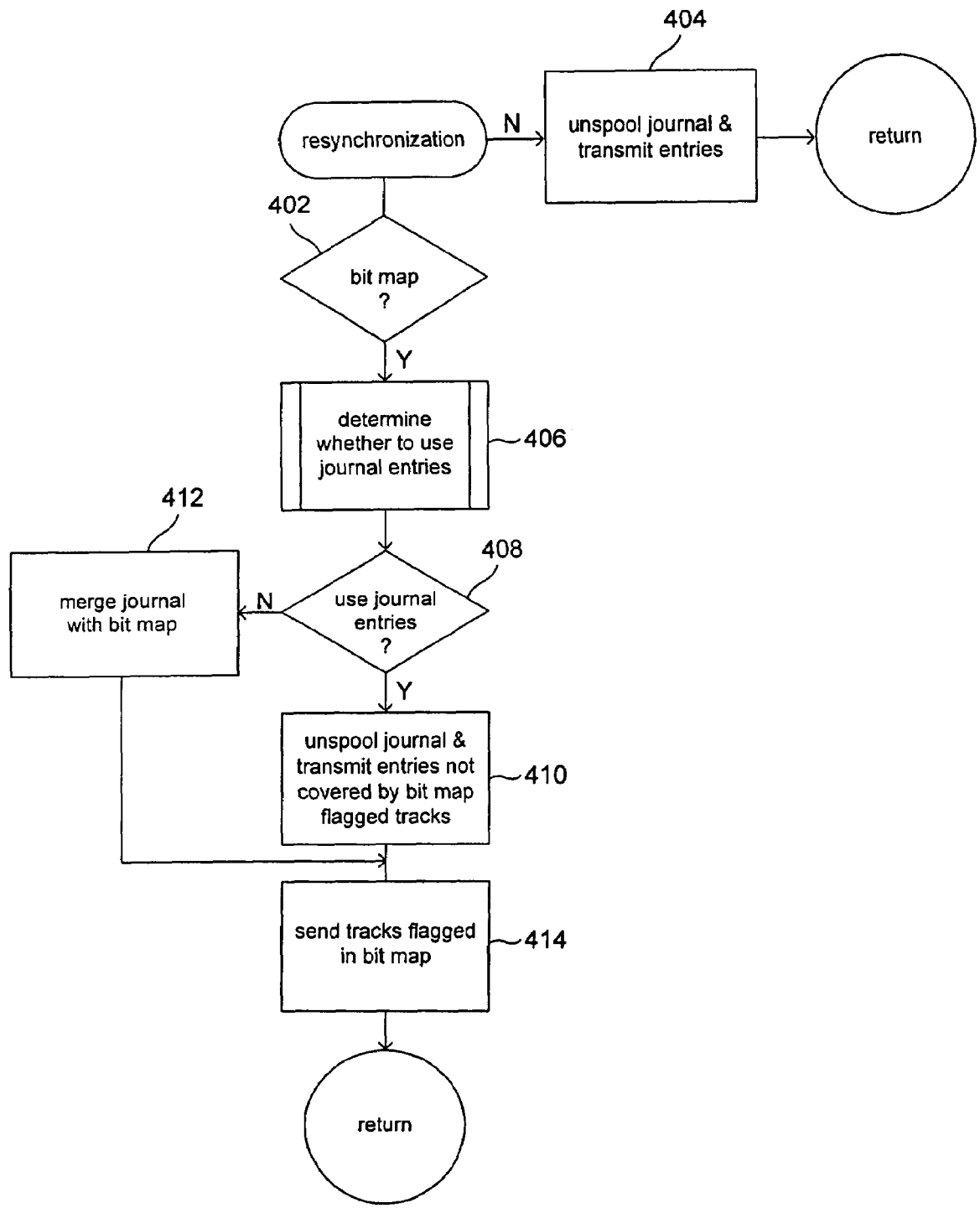
FIG. 4 is a control-flow diagram that illustrates enhanced synchronization according to one embodiment of the present invention.

FIG. 4 is a control-flow diagram that illustrates enhanced synchronization according to one embodiment of the present invention. This resynchronization routine may be called, for example, upon restoration of a failed communications link. First, in step 402, the resynchronization routine determines whether or not a track-based bitmap has been created due to filling of the journal. If not, then the journal is unspooled and journal entries are transmitted to the second component system, in step 404, in order to synchronize the secondary volume with the primary volume, as is done in the currently available journal-based resynchronization. If a track-based bitmap has been created, then, in step 406, the resynchronization routine determines whether to first unspool journal entries and forward the unspooled journal entries to the second component system prior to undertaking track-based bitmap resynchronization, or whether to instead merge the journal with the track-based bitmap and undertake bitmap-based resynchronization. If the determination is made to forward unspooled journal entries in addition to undertaking bitmap-based resynchronization, as determined in step 408, then those journal entries that are directed to tracks that are not flagged as altered in the track-based bitmap are unspooled and directed to the second component system for execution by the second component system to the secondary volume, in step 410. In this case, discard_bytes_per_track entries and/or journal_writes_per_track entries can be used to instead decide whether to forward journal entries directed to particular tracks, or to instead set a bit in the track-based bit map so that the entire track is later transmitted. In other words, track-based decisions on whether to use the journal or rely on the track-based bit map can be made. Otherwise, in step 412, the journal entries are merged with the track-based bitmap by determining the tracks to which WRITE operations represented by the journal entries are directed and setting the corresponding bits of the track-based bitmap to the binary value "1." In either case, tracks flagged by the track-based bitmap are then retrieved from the primary volume and transmitted to the second component system, in step 414.

Figure 5:
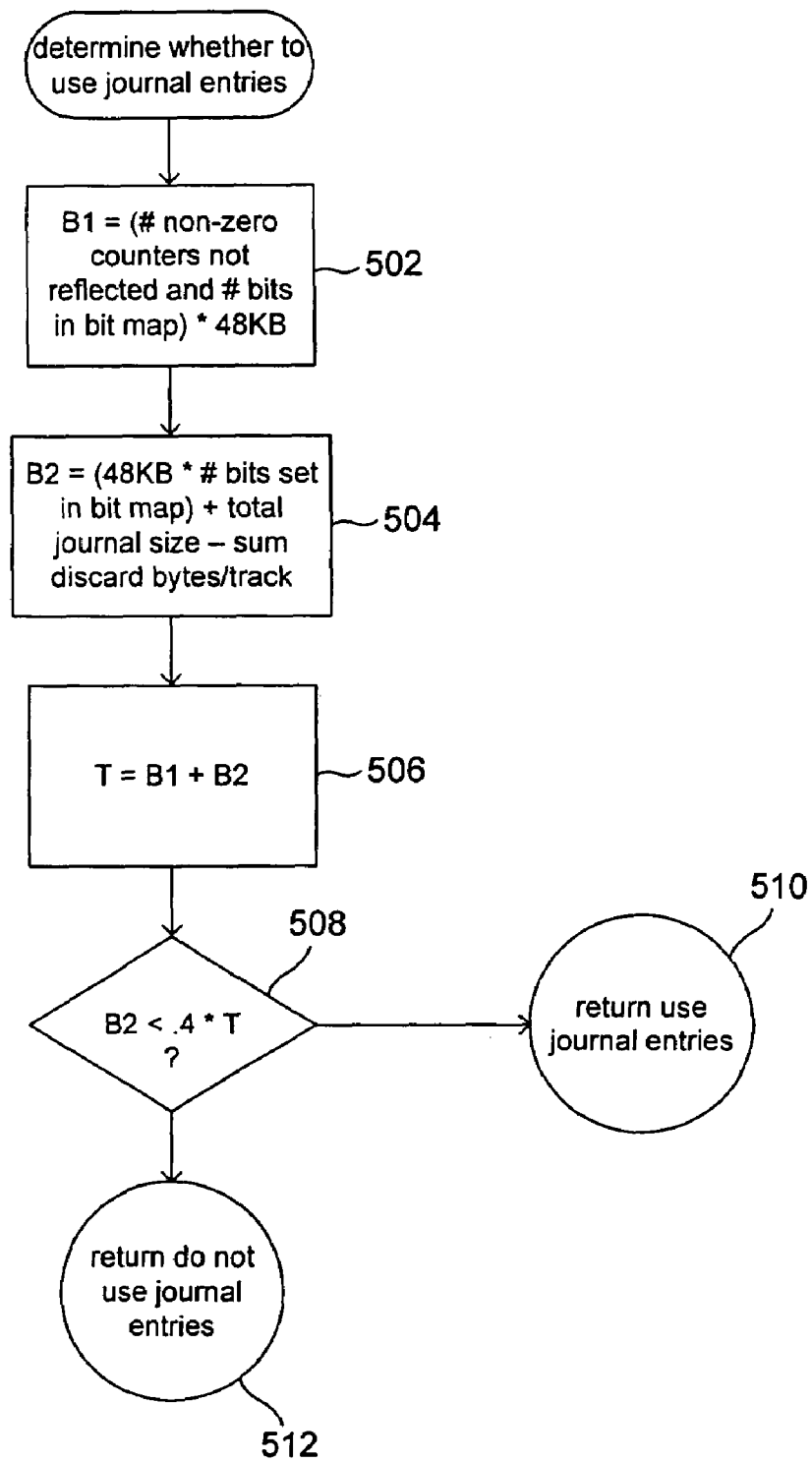
FIG. 5 is a control-flow diagram illustrating determination of whether or not to use journal entries separately, or to merge the journal with the track-based bit map in order to resynchronize the primary and secondary volumes of a system, according to one embodiment of the present invention.

FIG. 5 is a control-flow diagram illustrating determination of whether or not to use journal entries separately, or to merge the journal with the track-based bit map in order to resynchronize the primary and secondary volumes of a system, according to one embodiment of the present invention. In a first step 502, the local variable B1 is set to the sum of the current contents of the variables num_non-zero_counters_not_reflected and num_bits in_bitmap multiplied by the track length, in bytes:

$$B1 = (\text{num\_non-zero\_counters\_not\_reflected} + \text{num\_bits\_in\_bitmap}) * \text{track\_length}$$

The variable B1 thus reflects the number of bytes that would need to be transmitted in the case that only bit-map-based resynchronization is used. Next, in step 504, the local variable B2 is set to the contents of the variable num_bits_set_in_bitmap multiplied by the track length, in bytes, added to the contents of the variable total_journal_size, from which the contents of sum_discard_bytes are subtracted:

$$B2 = (\text{num\_bits\_set\_in\_bitmap} * \text{track\_length}) + \text{total\_journal\_size} - \text{sum\_discard\_bytes}$$

Thus, the variable B2 reflects the number of bytes that would need to be transmitted in the case that journal-based resynchronization is first undertaken, followed by bit-map-based resynchronization. Then, in step 506, the local variable T is set to the sum of local variables B1 and B2. When B2 is less than 0.4*T, as determined in step 508, then the routine returns an indication to use the journal entries separately from the track-based bitmap, in step 510. Otherwise, the routine returns an indication to merge the journal with the track-based bitmap and to therefore not use the journal entries separately from the track-based bitmap in step 512.

Although the present invention has been described in terms of particular embodiments, it is not intended that the invention be limited to these embodiments. Modifications within the spirit of the invention will be apparent to those skilled in the art. For example, any of an essentially limitless number of different data structures and variables may be used to monitor the states of the journal and track-based bitmap in order to facilitate a decision as to whether to use unspooled entries separately from a track-based bitmap prior to using the track-based bitmap or to merge the journal with the track-based bitmap during resynchronization. The decision may alternatively be used in operations other than resynchronization, involving maintenance of the primary volume and/or secondary volume, administration operations directed to the system as a whole, and other operations. The method of the present invention may be implemented in firmware, hardware, software, or a combination of firmware, hardware, and/or software, using a variety of different implementation tools, programming languages, control structures, data structures, modular organizations, and a variety of other variations of basic programming parameters and characteristics. While the context in which the present invention is described, above, involves a single primary volume and single secondary volume, the present invention may also be applied to systems in which data is stored at higher levels of redundancy and which contain a larger number of component data-storage systems linked by multiple links. In the disclosed embodiments, the primary volume is part of, or closely associated with the primary component system, and the secondary volume is part of, or closely associated with the second component system, but, in alternative systems, the primary volume and secondary volume may be remote from one or both of the primary component and second component systems.

The foregoing description, for purposes of explanation, used specific nomenclature to provide a thorough understanding of the invention. However, it will be apparent to one skilled in the art that the specific details are not required in order to practice the invention. The foregoing descriptions of specific embodiments of the present invention are presented for purpose of illustration and description. They are not intended to be exhaustive or to limit the invention to the precise forms disclosed. Obviously many modifications and variations are possible in view of the above teachings. The embodiments are shown and described in order to best explain the principles of the invention and its practical applications, to thereby enable others skilled in the art to best utilize the invention and various embodiments with various modifications as are suited to the particular use contemplated. It is intended that the scope of the invention be defined by the following claims and their equivalents:

The invention claimed is:

1. A method for efficiently resynchronizing a primary volume with a secondary volume in a system comprising a primary component system that stores data on the primary volume and a second component system that redundantly stores data stored in the primary volume on a secondary volume, the method comprising:

buffering WRITE requests in entries of a journal until the journal is filled;

when the journal is filled, marking tracks of the primary volume altered by execution of subsequent WRITE requests in a track-based bit map while preserving the filled journal for subsequent resynchronization;

maintaining and updating variables and data structures on the primary component system to facilitate deciding whether to employ journal-based-and-bitmap-based resynchronization or bitmap-based resynchronization; and upon undertaking resynchronization,
using the variables and data structures on the primary component system to determine whether to employ journal-based-and-bitmap-based resynchronization or bitmap-based resynchronization,
when use of journal-based-and-bitmap-based resynchronization is determined,
carrying out journal-based-and-bitmap-based resynchronization, and
when use of bitmap-based resynchronization is determined,
carrying out bitmap-based resynchronization.

2. The method of claim 1 wherein journal-based-and-bitmap-based resynchronization comprises:
first unspooling the journal entries and forwarding the WRITE requests contained in the unspooled journal entries to the second component system for execution to the secondary volume; and
then transmitting tracks marked in the track-based bit map to the second component system for storage in the secondary volume.

3. The method of claim 1 wherein bitmap-based resynchronization comprises:
first merging the journal with the track-based bit map; and
then transmitting tracks marked in the track-based bit map to the second component system for storage in the secondary volume.

4. The method of claim 1 wherein the variables and data structures on the primary component system maintained and updated to facilitate deciding whether to employ journal-based-and-bitmap-based resynchronization or to employ bitmap-based resynchronization include:
a data structure containing the number of journal entries per track of the primary volume;
an data structure containing estimates for each primary-volume track of the amount of data represented by the journal entries directed to the primary-volume track;
a variable containing an estimate of the number of bytes in the journal that need not be transmitted due to tracks marked for transmission following filling of the journal;
a variable containing a number of tracks to which journal entries are directed but which are not currently flagged in the track-based bit map;
a variable containing the number of entries in the track-based bitmap to indicate altered tracks; and
a variable containing the total journal size.

5. The method of claim 1 wherein using the variables and data structures on the primary component system to determine whether to employ journal-based-and-bitmap-based resynchronization or bitmap-based resynchronization further comprises:
using the variables and data structures on the primary component system to estimate a data-transfer overhead for carrying out journal-based-and-bitmap-based resynchronization;
using the variables and data structures on the primary component system to estimate a data-transfer overhead for carrying out bitmap-based resynchronization; and when the data-transfer overhead for carrying out journal-based-and-bitmap-based resynchronization is less than the data-transfer overhead for carrying out bitmap-based resynchronization, determining to carry out journal-based-and-bitmap-based resynchronization; and when the data-transfer overhead for carrying out journal-based-and-bitmap-based resynchronization is greater than the estimated data-transfer overhead for carrying out bitmap-based resynchronization, determining to carry out bitmap-based resynchronization.

6. The method of claim 1 wherein, prior to filling the journal, a next WRITE request directed to a single track is entered into the journal, the variables and data structures on the primary component system are updated by:
incrementing an entry corresponding to the single track in the data structure containing the number of journal entries per track of the primary volume;
incrementing an entry corresponding to the single track in the data structure containing estimates for each primary-volume track of the amount of data represented by the journal entries directed to the primary-volume track by a data size of the WRITE request;
incrementing the variable containing an estimate of the number of bytes in the journal that need not be transmitted due to tracks marked for transmission following filling of the journal by a data size of the WRITE request;
incrementing the variable containing the total journal size by a data size of the WRITE request; and
incrementing the variable containing a number of tracks to which journal entries are directed but which are not currently flagged in the track-based bit map.

7. The method of claim 1 wherein, prior to filling the journal, a next WRITE request directed to multiple tracks is entered into the journal, the variables and data structures on the primary component system are updated by:
incrementing each entry corresponding to each of the multiple tracks in the data structure containing the number of journal entries per track of the primary volume;
incrementing the variable containing the total journal size by a data size of the WRITE request; and
incrementing, for each of the multiple tracks, the variable containing a number of tracks to which journal entries are directed but which are not currently flagged in the track-based bit map.

8. The method of claim 1 wherein, prior to filling the journal, an acknowledgement for a forwarded WRITE request directed to a single track is received by the primary component system, the variables and data structures on the primary component system are updated by:
decrementing an entry corresponding to the single track in the data structure containing the number of journal entries per track of the primary volume;
decrementing an entry corresponding to the single track in the data structure containing estimates for each primary-volume track of the amount of data represented by the journal entries directed to the primary-volume track by a data size of the WRITE request;
decrementing the variable containing an estimate of the number of bytes in the journal that need not be transmitted due to tracks marked for transmission following filling of the journal by a data size of the WRITE request;
decrementing the variable containing the total journal size by a data size of the WRITE request; and
decrementing the variable containing a number of tracks to which journal entries are directed but which are not currently flagged in the track-based bit map.

9. The method of claim 1 wherein, prior to filling the journal, an acknowledgement for a forwarded WRITE request directed to a multiple tracks is received by the primary component system, the variables and data structures on the primary component system are updated by
- decrementing each entry corresponding to each of the multiple tracks in the data structure containing the number of journal entries per track of the primary volume;
- decrementing the variable containing the total journal size by a data size of the WRITE request; and
- decrementing, for each of the multiple tracks, the variable containing a number of tracks to which journal entries are directed but which are not currently flagged in the track-based bit map.

10. The method of claim 1 wherein, subsequent to filling the journal, upon receiving a next WRITE request, the variables and data structures on the primary component system are updated by:
- for each track to which the WRITE request is directed,
  - when a bit in the track-based bit-map is not set to indicate that the track has been altered,
    - setting a bit in the track-based bit-map to indicate that the track has been altered, and
  - when the entry corresponding to the track in the data structure containing estimates for each primary-volume track of the amount of data represented by the journal entries directed to the primary-volume track is greater than 0,
    - decrementing the variable containing a number of tracks to which journal entries are directed but which are not currently flagged in the track-based bit map.

11. Computer instructions that implement the method of claim 1 encoded in a computer readable memory.

12. A system comprising:
- a primary component system that stores data on a primary volume;
- a second component system that redundantly stores data stored in the primary volume on a secondary volume; and
- resynchronization logic that executes on the primary component system to efficiently resynchronize the primary volume with the secondary volume by
  - buffering WRITE requests in entries of a journal until the journal is filled,
  - when the journal is filled, marking tracks of the primary volume altered by execution of subsequent WRITE requests in a track-based bit map while preserving the filled journal for subsequent resynchronization,
  - maintaining and updating variables and data structures on the primary component system to facilitate deciding whether to employ journal-based-and-bitmap-based resynchronization or bitmap-based resynchronization; and
  - upon undertaking resynchronization,
    - using the variables and data structures on the primary component system to determine whether to employ journal-based-and-bitmap-based resynchronization or bitmap-based resynchronization,
    - when use of journal-based-and-bitmap-based resynchronization is determined,
      - carrying out journal-based-and-bitmap-based resynchronization, and
    - when use of bitmap-based resynchronization is determined,
      - carrying out bitmap-based resynchronization.

13. The system of claim 12 wherein journal-based-and-bitmap-based resynchronization comprises:
- first unspooling the journal entries and forwarding the WRITE requests contained in the unspooled journal entries to the second component system for execution to the secondary volume; and
- then transmitting tracks marked in the track-based bit map to the second component system for storage in the secondary volume.

14. The system of claim 12 wherein bitmap-based resynchronization comprises:
- first merging the journal with the track-based bit map; and
- then transmitting tracks marked in the track-based bit map to the second component system for storage in the secondary volume.

15. The system of claim 12 wherein the variables and data structures on the primary component system maintained and updated to facilitate deciding whether to employ journal-based-and-bitmap-based resynchronization or to employ bitmap-based resynchronization include:
- a data structure containing the number of journal entries per track of the primary volume;
- an data structure containing estimates for each primary-volume track of the amount of data represented by the journal entries directed to the primary-volume track;
- a variable containing an estimate of the number of bytes in the journal that need not be transmitted due to tracks marked for transmission following filling of the journal;
- a variable containing a number of tracks to which journal entries are directed but which are not currently flagged in the track-based bit map;
- a variable containing the number of entries in the track-based bitmap to indicate altered tracks; and
- a variable containing the total journal size.

* * * * *